(12) United States Patent
Nakazawa

(10) Patent No.: US 11,782,972 B2
(45) Date of Patent: Oct. 10, 2023

(54) INFORMATION PROCESSING SYSTEM, INFORMATION CODE GENERATING SYSTEM, INFORMATION PROCESSING METHOD, AND INFORMATION CODE GENERATING METHOD

(71) Applicant: Rakuten Group, Inc., Tokyo (JP)

(72) Inventor: Mitsuru Nakazawa, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/711,336

(22) Filed: Apr. 1, 2022

(65) Prior Publication Data

US 2022/0230046 A1 Jul. 21, 2022

Related U.S. Application Data

(62) Division of application No. 17/253,234, filed as application No. PCT/JP2019/028677 on Jul. 22, 2019, now Pat. No. 11,328,202.

(51) Int. Cl.
```
G06F 16/55    (2019.01)
G06K 7/14     (2006.01)
G06K 19/14    (2006.01)
G06V 30/224   (2022.01)
G06V 30/19    (2022.01)
```
(52) U.S. Cl.
CPC .......... *G06F 16/55* (2019.01); *G06K 7/1417* (2013.01); *G06K 19/14* (2013.01); *G06V 30/19173* (2022.01); *G06V 30/224* (2022.01)

(58) Field of Classification Search
CPC ...... G06F 16/55; G06K 7/1417; G06K 19/14; G06K 19/06037; G06K 19/06103; G06V 30/19173; G06V 30/244
See application file for complete search history.

(56) References Cited

U.S. PATENT DOCUMENTS

2007/0047008 A1* 3/2007 Graham ................. G06V 20/62
358/401

FOREIGN PATENT DOCUMENTS

JP 2012-216155 A 11/2012

* cited by examiner

*Primary Examiner* — Matthew Mikels
(74) *Attorney, Agent, or Firm* — Sughrue Mion, PLLC

(57) ABSTRACT

To easily determine whether an information code has been replaced, an information processing device obtains, based on original information obtained by photographing an optically readable information code and decoding the same, first class information indicating a class into which an object visually represented by first visual information which should be displayed together with an information code is classified. The information processing device obtains second class information indicating a class into which an object visually represented by second visual information photographed together with the information code because of display together with the information code is classified. The information processing device compares the first class information with the second class information. The information processing device controls, based on a result of the comparison, execution of predetermined processing using the original information.

18 Claims, 21 Drawing Sheets

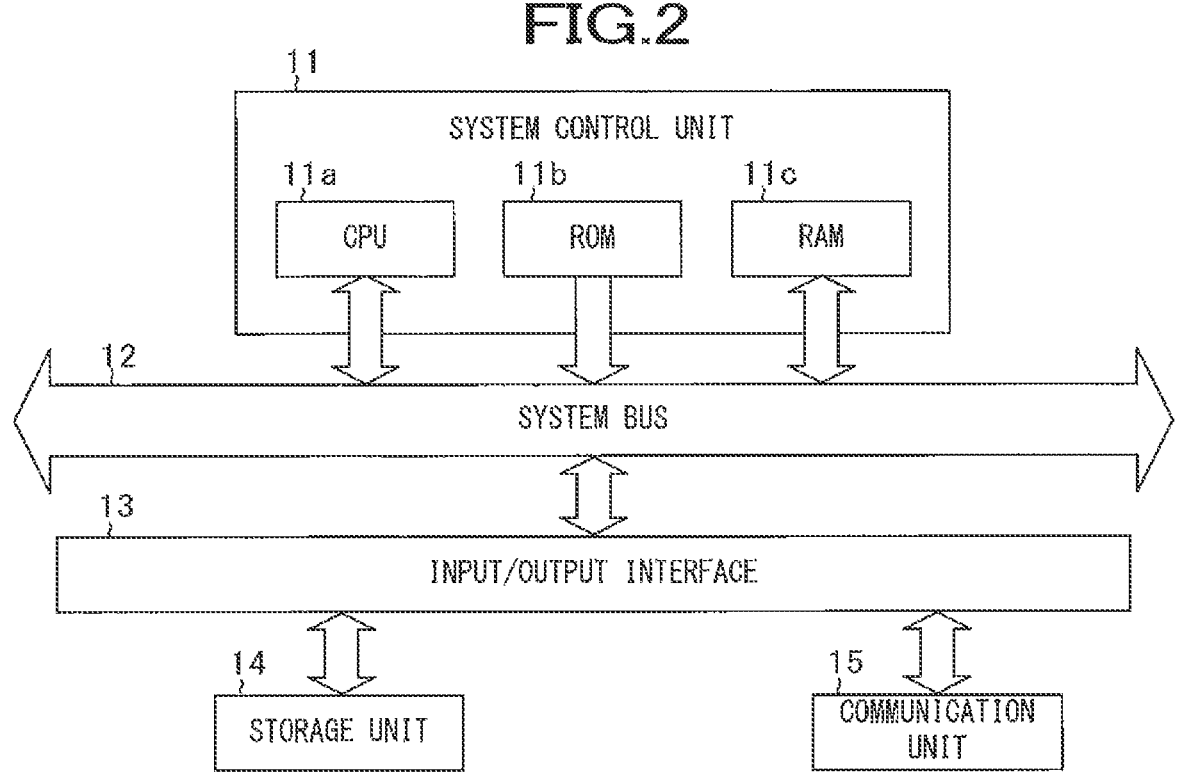

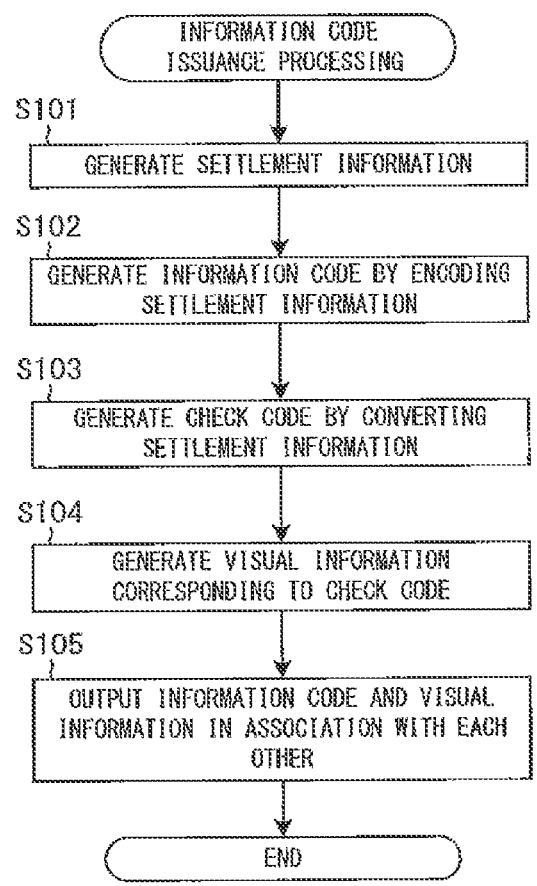

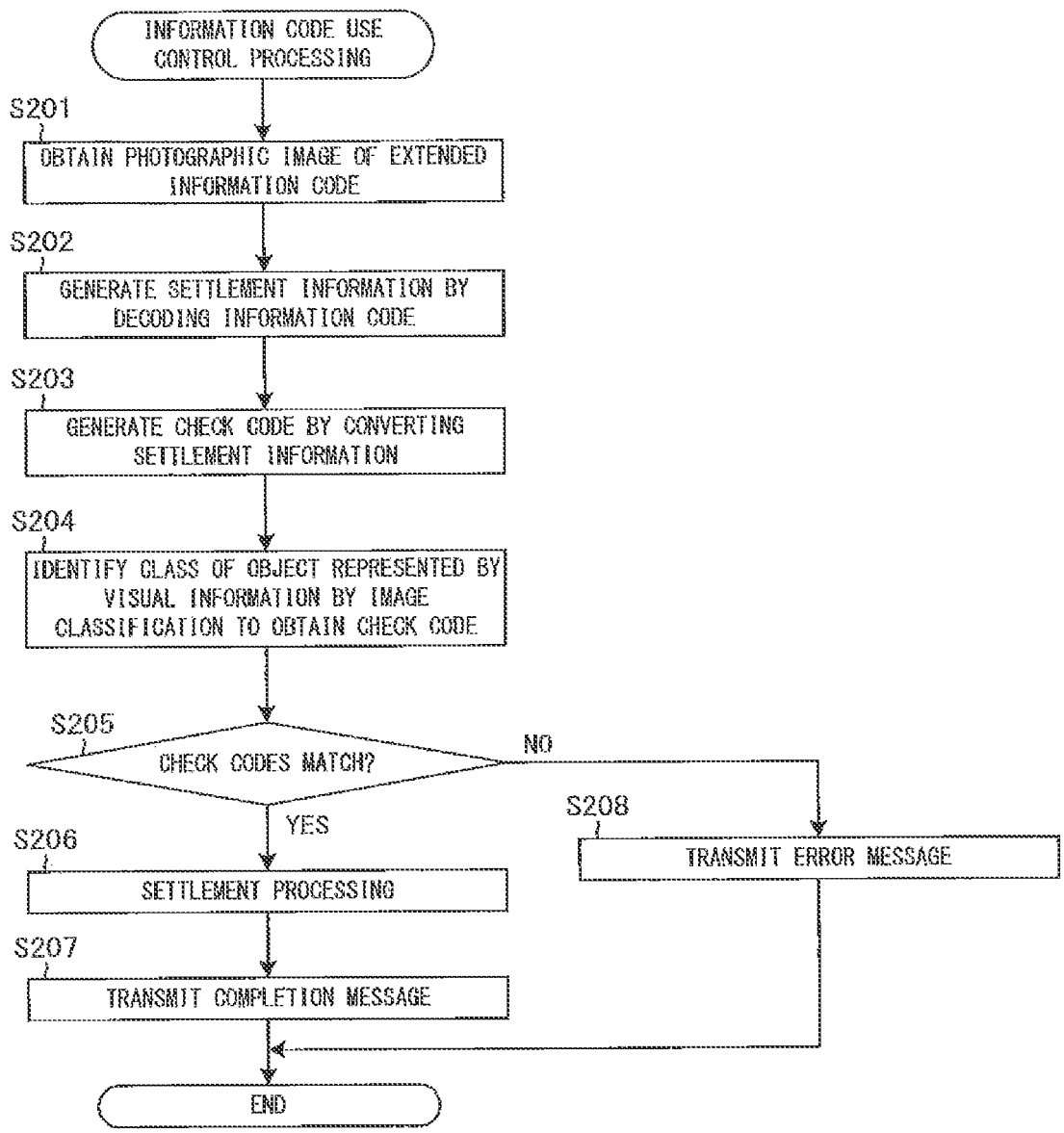

FIG.10

| CHECK CODE DB | 14a |
|---|---|
| STORE ID | |
| SETTLEMENT INFORMATION | |
| CHECK CODE | |

INFORMATION PROCESSING SYSTEM, INFORMATION CODE GENERATING SYSTEM, INFORMATION PROCESSING METHOD, AND INFORMATION CODE GENERATING METHOD

CROSS REFERENCE TO RELATED APPLICATION

This application is a Divisional Application of U.S. application Ser. No. 17/253,234 filed Dec. 17, 2020, which is a National Stage of International Application No. PCT/JP2019/028677 filed Jul. 22, 2019, the entire contents of these applications being hereby incorporated by reference.

TECHNICAL FIELD

The present invention relates to a system for detecting a fraud regarding an information code representing information so as to be optically readable.

BACKGROUND ART

Conventionally, information codes such as a QR code (registered trademark) (ISO/IEC 18004) and a bar code are widely used. The information code is obtained by encoding, for example, information related to an object to which the information code is adhered and something provided in a place where the information code is displayed. Original information to be encoded is, for example, information itself provided to a user or a uniform resource locator (URL) for accessing the information provided to the user. The user may obtain the original information by reading the information code with a terminal device such as a mobile terminal equipped with a digital camera, for example.

Technologies for detecting a fraud regarding such information code is also developed. For example, Patent Literature 1 discloses a fraud detecting system which encodes predetermined information and information for detection for detecting the fraud into the information code. When the information code is read, this system checks the information for detection obtained by decoding the information code against information for checking recorded in a database to determine whether there is any fraud regarding the information code.

CITATION LIST

Patent Literature

Patent Literature 1: JP 2014-029659 A

SUMMARY OF INVENTION

Technical Problem

However, even with the technology as described above, it is not possible to detect all the frauds regarding the information code. For example, in a case where an application or the like for generating the information code is widely provided, anyone may officially generate the information code. In this case, it is possible to encode fraudulent information together with the information for detection to generate the information code, and cause the information for checking which matches the information for detection to be officially recorded in the database. It is not possible to detect the fraud as for the information code generated in this manner.

By the way, the information code is generally configured by arranging a large number of geometric figures such as lines and squares. Therefore, it is usually impossible for a person to visually recognize the original information from the information code. When a certain information code has been replaced with another information code, it is also difficult for a person to notice that the information code has been replaced.

One or more embodiments of the present invention are made in view of the above-described points, and are directed to provide an information processing system, an information code generating system, an information processing method, and an information code generating method that enable a person to easily determine whether an information code has been replaced.

Solution to Problem

In response to the above issue, an aspect of the present invention is an information processing system comprising: a first class information obtaining means that obtains, based on original information obtained by photographing and decoding an optically readable information code, first class information indicating a class into which an object visually represented by first visual information which should be displayed together with the information code is classified; a second class information obtaining means that obtains second class information indicating a class into which an object visually represented by second visual information photographed together with the information code because of being displayed together with the information code is classified; a comparing means that compares the obtained first class information with the obtained second class information; and a control means that controls, based on a result of the comparison, execution of predetermined processing using the obtained original information.

According to this aspect, together with a displayed information code (hereinafter referred to as a first information code), second visual information visually representing a certain object is photographed. The second visual information is the visual information actually being displayed together with the first information code. Original information is obtained by decoding the first information code. Based on the original information, first class information indicating a class into which an object visually represented by first visual information is classified is obtained. The first visual information is the visual information which should be displayed together with the first information code. On the other hand, second class information indicating a class into which an object visually represented by the second visual information is classified is obtained. Then, execution of predetermined processing using the original information is controlled based on a result of comparison between the first class information and the second class information. In a case where the second class information is different from the first class information, the first information code is not a second information code which should be displayed together with the second visual information. Therefore, the second information code that was displayed together with the second visual information might be replaced with the first visual information. In this case, the execution of the predetermined processing may be rejected based on the result of the comparison. On the other hand, even in a case where the second visual information matches the first visual information, the information code might have been replaced. Specifically, it is considered that a combination of a third information code originally displayed and third visual information which should be displayed together with the third information code has been replaced with a combination of the first information code and the first visual information (second visual information). Here, a person can visually recognize to which class an object represented by each visual information is classified. Therefore, in a case where the person looked at the visual information before, he/she can compare the class into which the object represented by the visual information is classified and the class in which the object represented by the currently displayed first visual information is classified based on memory and vision of the person. As a result of the comparison, the person may determine whether the information code has been replaced. In a case where a person determines that the information code has been replaced, the person may stop the reading of the first information code currently displayed. As a result, predetermined processing is not executed. In this manner, a fraud regarding the information code is suppressed.

Another aspect of the present invention is the information processing system according to claim 1, wherein the first class information obtaining means generates the first class information by converting the obtained original information, and the second class information obtaining means obtains the second class information by performing image classification on a photographic image obtained by photographing the information code and the second visual information.

According to this aspect, it becomes possible to obtain the first class information even if the original information and the first class information are not stored in advance in association with each other. It is also possible to obtain the second class information indicating the same class as the class which persons tend to recognize visually from the second visual information.

Yet another aspect of the present invention is the information processing system according to claim 2, wherein the first class information obtaining means generates the first class information from the original information by using a method different from an encoding method for generating the information code from the original information.

According to this aspect, the first class information different from the information code is generated by the conversion.

Yet another aspect of the present invention is the information processing system according to any one of claims 1 to 3, further comprising: a first position information obtaining means that obtains, based on the obtained original information, first position information indicating a position of a place where the information code should be displayed; and a second position information obtaining means that obtains second position information indicating a position of a place where the information code and the second visual information have been photographed, wherein the comparing means further compares the obtained first position information with the obtained second position information, and the control means controls the execution of the predetermined processing based on the result of the comparison between the first class information and the second class information and a result of comparison between the first position information and the second position information.

According to this aspect, in a case where a distance between a first place where the photographed first information code should be displayed and a second place where the first information code is actually displayed is relatively long, another information code which should be displayed in the second place might be replaced with the first information code. In this case, even if the first class information and the second class information match, it is possible to reject the predetermined processing based on a comparison result of the first position information and the second position information.

Yet another aspect of the present invention is the information processing system according to any one of claims 1 to 4, wherein, in a case where the comparison result satisfies a predetermined condition, the control means causes the predetermined processing to be executed, and in a case where the comparison result does not satisfy the predetermined condition, the control means does not cause the predetermined processing to be executed.

According to this aspect, in a case where the information code has been replaced, the predetermined processing is prevented from being illegally executed.

Yet another aspect of the present invention is the information processing system according to any one of claims 1 to 4, wherein, in a case where the comparison result satisfies a predetermined condition, the control means causes the predetermined processing to be executed, and in a case where the comparison result does not satisfy the predetermined condition, the control means causes a notice based on the comparison result to be presented to a user.

According to this aspect, the user can recognize that the information code might be replaced.

Yet another aspect of the present invention is the information processing system according to claim 6, wherein the control means determines whether to cause the predetermined processing to be executed according to selection by the user in a case where the comparison result does not satisfy the predetermined condition.

According to this aspect, it is possible for the user to execute the predetermined processing at user's own responsibility after recognizing that the information code might be replaced.

Yet another aspect of the present invention is an information code generating system comprising: an information code generating means that encodes original information to generate an optically readable information code; a class information generating means that generates, based on the original information, class information indicating a class into which an object capable of being visually represented is classified; and an output means that outputs the generated information code and visual information visually representing the object classified into the class indicated by the generated class information in association with each other.

According to this aspect, by an output of the information code and the visual information which should be displayed together with the information code, the visual information is displayed together with the information code. This visual information visually represents a certain object. Therefore, a person can compare the class into which the object indicated by the visual information previously displayed together with the information code is classified with the class into which the object indicated by the visual information currently displayed together with the information code is classified based on memory and vision of the person. As a result of the comparison, the person can determine whether the information code has been replaced. If a person determines that the information code has been replaced, the person can stop reading of the currently displayed information code. As a result, predetermined processing is not executed. In this manner, a fraud regarding the information code is suppressed.

Yet another aspect of the present invention is the information code generating system according to claim 8, wherein the class information generating means generates the class information by converting the original information by using a method different from an encoding method for generating the information code from the original information.

According to this aspect, class information different from the information code is generated by conversion.

Yet another aspect of the present invention is the information code generating system according to claim 9, further comprising: a determining means that determines, for each information code to be generated, a conversion specification to be used among a plurality of different conversion specifications capable of being used for converting the original information to generate the class information, wherein the class information generating means generates the class information according to the determined conversion specification, and the information code generating means encodes the original information and specification information indicating the determined conversion specification among the plurality of conversion specifications to generate the information code.

According to this aspect, it becomes difficult to identify the conversion specification used to generate the visual information. Therefore, it is possible to suppress a malicious third party from generating correct visual information which should be displayed together with a fraudulent information code.

Yet another aspect of the present invention is the information code generating system according to claim 10, wherein the specification information indicates a date at which the information code and the visual information are output, and the class information generating means generates the class information according to the conversion specification corresponding to the date among the plurality of conversion specifications.

Yet another aspect of the present invention is the information code generating system according to claim 8, further comprising: a position information obtaining means that obtains position information indicating a position of a place where the information code should be displayed, wherein the class information generating means generates the class information different from already generated class information generated for another information code which should be displayed in a place within a predetermined distance from the place indicated by the obtained position information.

According to this aspect, visual information different from visual information which should be displayed together with another information code which should be displayed in a place within a predetermined distance from a place where the generated information code should be displayed is generated. Therefore, in a case where a combination of the information code and the visual information has been replaced with a combination of another information code which should be displayed in a relatively close place and the visual information, a person can determine whether the information code has been replaced by looking at the visual information.

Yet another aspect of the present invention is the information code generating system according to claim 12, wherein the class information generating means generates class information, among a plurality of pieces of class information different from the already generated class information, having a relatively small degree of overlap with the already generated class information.

According to this aspect, visual information easily distinguished from visual information which should be displayed together with another information code which should be displayed in a place within a predetermined distance from a place where the information code to be generated should be displayed is generated. Therefore, it is possible for a person to easily determine whether the information code has been replaced even if the memory of the visual information seen in the past is ambiguous.

Yet another aspect of the present invention is the information code generating system according to any one of claims 8 to 13, wherein the visual information represents the object such that the class may be recognized through human vision.

Yet another aspect of the present invention is the information code generating system according to any one of claims 8 to 14, wherein the visual information includes at least one of a picture, a number, a character, and a symbol.

Yet another aspect of the present invention is the information code generating system according to any one of claims 8 to 15, wherein the information code includes a plurality of geometric figures.

Yet another aspect of the present invention is the information code generating system according to any one of claims 8 to 16, wherein the output means outputs an image in which the visual information is arranged outside the information code.

Yet another aspect of the present invention is the information code generating system according to any one of claims 8 to 17, wherein the output means outputs an image in which the visual information is arranged inside the information code.

Yet another aspect of the present invention is an information processing method performed by a computer, the method comprising: a first class information obtaining step of obtaining, based on original information obtained by photographing and decoding an optically readable information code, first class information indicating a class into which an object visually represented by first visual information which should be displayed together with the information code is classified; a second class information obtaining step of obtaining second class information indicating a class into which an object visually represented by second visual information photographed together with the information code because of being displayed together with the information code is classified; a comparing step of comparing the obtained first class information with the obtained second class information; and a control step of controlling, based on a result of the comparison, execution of predetermined processing using the obtained original information.

Yet another aspect of the present invention is an information code generating method performed by a computer, the method comprising: an information code generating step of encoding original information to generate an optically readable information code; a class information generating step of generating, based on the original information, class information indicating a class into which an object capable of being visually represented is classified; and an output step of outputting the generated information code and visual information visually representing the object classified into the class indicated by the generated class information in association with each other.

Advantageous Effects of Invention

According to the present invention, it becomes easier for a person to determine whether the information code has been replaced.

BRIEF DESCRIPTION OF DRAWINGS

FIG. 2 is a block diagram illustrating an example of a schematic configuration of a settlement management server 1 according to one embodiment.

FIG. 8 is a flowchart illustrating an example of information code issuance processing by the system control unit 11 of the settlement management server 1.

FIG. 9 is a flowchart illustrating an example of information code use control processing by the system control unit 11 of the settlement management server 1.

FIG. 10 is a view illustrating an example of information stored in a check code DB 14a.

FIG. 13 is a view illustrating an example of information stored in the check code DB 14a.

DESCRIPTION OF EMBODIMENTS

Hereinafter, embodiments of the present invention are described in detail with reference to the drawings. Some of the embodiments described below are the embodiments in a case where the present invention is applied to an electronic settlement system for settling a purchase price of an item or a usage fee of a service based on reading of an information code by a terminal device. By decoding the read information code for settlement, settlement information is obtained. The electronic settlement system identifies a settlement amount and an account of a store to which the amount is paid from the settlement information.

The information code for settlement is sometimes displayed on a display of the terminal device, but this is sometimes printed on a predetermined object such as a sticker. For example, the sticker on which the information code is printed is adhered in the store. A malicious third party might remove this sticker and adhere a sticker on which another information code is printed. Alternatively, this third party might adhere another sticker over the original sticker. In this case, for example, it is difficult for a customer who wants to purchase an item at the store to notice that the information code has been replaced by merely looking at the information code on the sticker. Also, since it is extremely difficult for a person to memorize the information code, it is difficult even for an employee of the store to notice that the information code has been replaced. If the information code is read as is and settlement processing is performed, an amount is paid to an account of the malicious third party. With popularization of the electronic settlement using the information code, it is desired to prevent such a fraud.

1. First Embodiment 1-1. Configuration of Behavior Analyzing System

Figure 1:
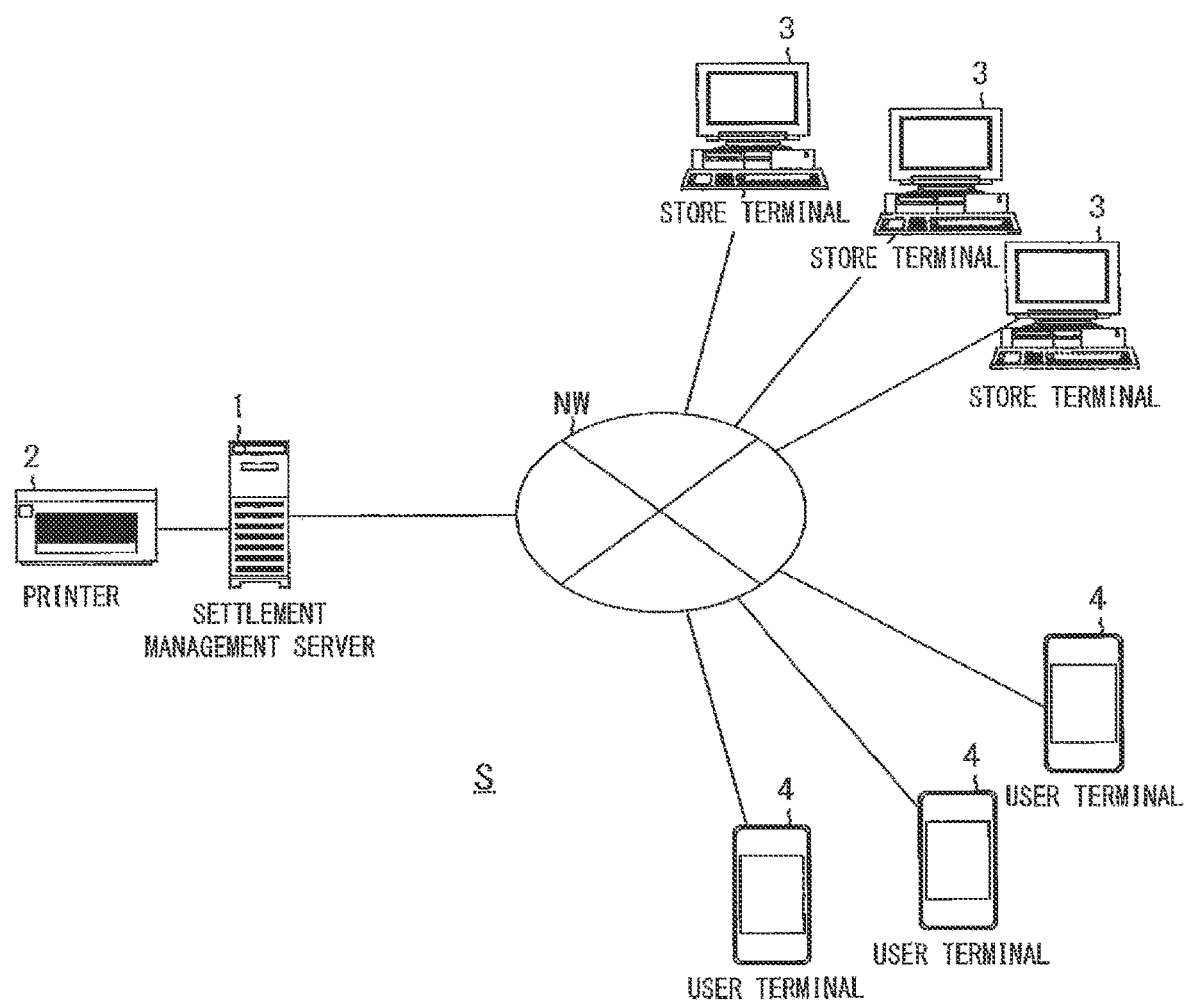
FIG. 1 is a view illustrating an example of a schematic configuration of an electronic settlement system S according to one embodiment.

First, a configuration of an electronic settlement system S according to a first embodiment will be described with reference to FIG. 1. FIG. 1 is a view illustrating an example of a schematic configuration of the electronic settlement system S according to this embodiment.

As illustrated in FIG. 1, the electronic settlement system S includes a settlement management server 1, a printer 2, a plurality of store terminals 3, and a plurality of user terminals 4. The settlement management server 1, each store terminal 3, and each user terminal 4 are connected to a network NW. The network NW is constructed by, for example, the Internet, a dedicated communication line (for example, a community antenna television (CATV) line), a mobile communication network (including a base station and the like), a gateway and the like.

The settlement management server 1 issues an information code obtained by encoding settlement information, the information code combined with visual information to be described later. The combination of the information code and the visual information is referred to as an extended information code. The information code may be issued for each item or each service provided by a store. Also, the settlement management server 1 executes electronic settlement based on the settlement information obtained by decoding the information code in the extended information code read by the user terminal 4. At that time, the settlement management server determines, based on the visual information added to the information code, whether there is a fraud regarding the information code (check the information code). Examples of the fraud determined by the settlement management server 1 are described below.

(1) The extended information code includes a fraudulent information code.

(2) The extended information code includes an official information code, but only the information code between the information code and the visual information originally included in the extended code has been replaced.

In this embodiment, the information code issued by the settlement management server 1 is referred to as the official information code. Note that, a device which issues the information code and a device which performs the electronic settlement may be different devices. Also, the device which performs the electronic settlement and a device which checks the information code may be different devices.

The printer 2 is connected to the settlement management server 1. Alternatively, the settlement management server 1 may be provided with the printer 2. The printer 2 prints the extended information code on a predetermined object under the control of the settlement management server 1. Examples of the predetermined object include a sticker, paper, a plastic plate and the like. The predetermined object on which the information code is printed may be mailed to a store which provides an item or a service corresponding to the information code, for example.

Each store terminal 3 is a terminal device installed in the store which sells the item or provides the service. Examples of the store terminal 3 include a personal computer, a tablet computer, a smartphone, a mobile phone, a personal digital assistant (PDA) and the like. An application program for requesting issuance of the extended information code is installed on each store terminal. The store terminal 3 requests the issuance of the extended information code from the settlement management server 1 based on an operation of an employee of the store. In response to this request, the settlement management server 1 issues a new extended information code.

Each user terminal 4 is a terminal device used by a user as a consumer. Examples of the user terminal 4 include a smartphone, a tablet computer, a mobile phone, a PDA and the like. An application program for electronic settlement is installed on each user terminal 4. Each user terminal 4 is provided with a digital camera. The user photographs the extended information code displayed on a predetermined object with this digital camera. The user terminal 4 transmits a photographic image of the extended information code obtained by photographing to the settlement management server 1, for example. The settlement management server 1 checks the information code and executes settlement processing based on the photographic image.

1-2. Configuration of Settlement Management Server

Next, a configuration of the settlement management server 1 will be described with reference to FIG. 2. FIG. 2 is a block diagram illustrating an example of a schematic configuration of the settlement management server 1 according to this embodiment. As illustrated in FIG. 2, the settlement management server 1 is provided with a system control unit 11, a system bus 12, an input/output interface 13, a storage unit 14, and a communication unit 15. The system control unit 11 and the input/output interface 13 are connected to each other via the system bus 12.

The system control unit 11 includes a central processing unit (CPU) 11a, a read only memory (ROM) 11b, a random access memory (RAM) 11c and the like.

The input/output interface 13 performs interface processing between the storage unit 14 and communication unit 15 and the system control unit 11.

The storage unit 14 includes, for example, a hard disk drive and the like. Various databases are stored in the storage unit 14. Examples of the database stored in the storage unit 14 include a database regarding the stores registered in the electronic settlement system S, a database regarding the users registered in the electronic settlement system S, a database regarding the item and service for which the information code is issued and the like. The storage unit 14 also stores various programs such as an operating system, a database management system (DBMS), and a server program. The server program is a program which causes the system control unit 11 to issue the information code, to check the information code, and to execute the settlement processing. The server program may be obtained from another device via the network NW, for example. Alternatively, the server program may also be recorded on a recording medium such as a magnetic tape, an optical disk, and a memory card, and read via a drive device.

The communication unit 15 is connected to the store terminals 3 and the user terminals 4 via the network NW and controls a communication state with these devices.

1-3. Configuration of Extended Information Code

Figure 3A:
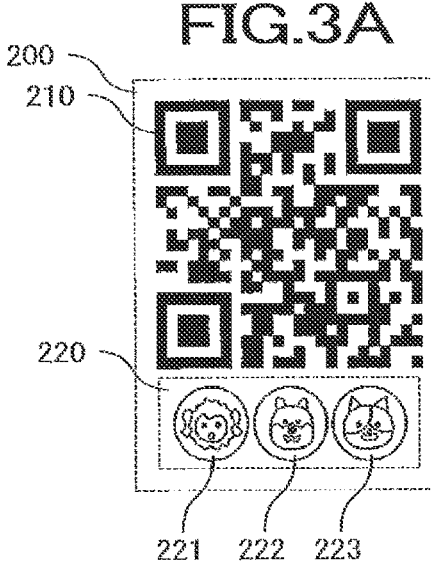
FIG. 3A is a view illustrating an example of an extended information code 200.
Figure 3B:
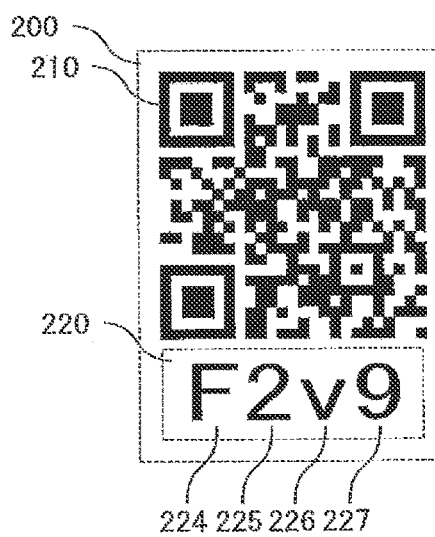
FIG. 3B is a view illustrating an example of the extended information code 200.
Figure 3C:
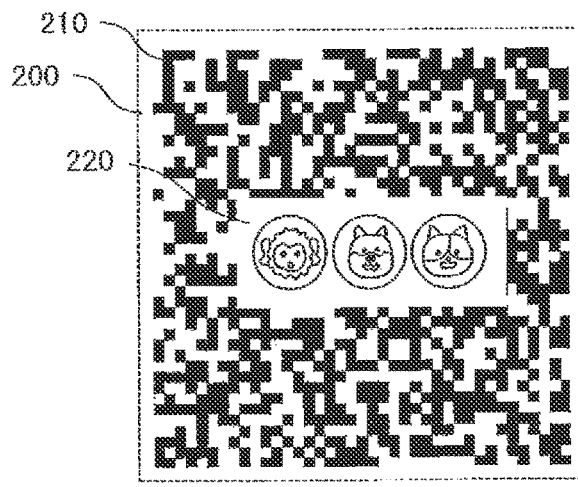
FIG. 3C is a view illustrating an example of the extended information code 200.

Next, a configuration of the extended information code issued in the electronic settlement system S will be described with reference to FIGS. 3A to 3C. FIGS. 3A to 3C are views illustrating examples of an extended information code 200. As illustrated in FIG. 3A, the extended information code 200 includes an information code 210 and visual information 220.

The information code 210 is optically readable. The optically readable information code is a code which may be detected by using a device such as a charge-coupled device (CCD) sensor, a complementary metal oxide semiconductor (CMOS) sensor, and other optical sensor or laser sensor, for example. In this embodiment, the digital camera is used. The information code 210 includes, for example, a plurality of geometric figures. Examples of the geometric figures include a rectangle, a triangle, a circle, a line (thin rectangle) and the like. A figure formed by combining a plurality of such basic geometric figures is also recognized as a geometric figure. It is usually significantly difficult for a person to identify encoded original information by looking at the information code 210. The generated information code 210 may be, for example, a two-dimensional code or a one-dimensional barcode. Standards of the information code 210 are not particularly limited. Examples of the two-dimensional code include a QR code (registered trademark), a data matrix code, a maxi-code and the like. Examples of barcode standards include Japanese article number (JAN), European article number (EAN), universal product code (UPC) and the like.

The visual information 220 is information which visually represents certain object(s). A type of the object is not particularly limited. Examples of the object include animals, imaginary characters, vehicles, tools, sports, numbers, letters, symbols and the like. The visual information 220 represents the object so that a person may visually recognize a class of the object. In a case where the object is animals, examples of the class include a dog, a cat, a monkey and the like. In a case of the sports, examples of the class include football, baseball, tennis and the like. In a case of the numbers, examples of the class include "0", "1", "2" and the like. In a case of the letters, examples of the class include "A", "B", "C" and the like. The classes may be defined in any manner as long as they are visually recognizable to a person.

One specific piece of visual information 220 is associated with each officially issued information code 210. Therefore, there is only one piece of visual information 220 which should be displayed together with a specific information code 210. It is difficult for a person to determine whether the information code 210 has been replaced only by looking at the information code 210 currently displayed. On the other hand, if it is possible to determine whether the visual information 220 seen in the past matches the visual information 220 currently being seen, it becomes possible for a person to determine whether the information code 210 displayed together with the visual information 220 has been replaced. Therefore, it is desirable that the object(s) be represented by the visual information 220 such that a person may easily memorize the class of the object(s) represented by the visual information 220 by looking at the visual information 220. For example, the visual information 220 includes at least one of picture(s), number(s), letter(s), and symbol(s). Examples of the picture include an illustration, a photograph and the like. The visual information 220 illustrated in FIG. 3A includes animal illustrations 221, 222, and 223. The illustrations 221 to 223 are components of the visual information 220. The illustration 221 is an illustration of a sheep. The illustration 222 is an illustration of a dog. The illustration 223 is an illustration of a cat.

In the extended information code 200 illustrated in FIG. 3B, the visual information 220 includes letters 224, 225, 226, and 227. The letters 224 to 227 are components of the visual information 220. The letter 224 indicates "F". The letter 225 indicates "2". The letter 226 indicates "v". The letter 227 indicates "9".

In FIGS. 3A and 3B, the visual information 220 is arranged outside the information code 210. The visual information 220 may be arranged in any place such as above the information code 210, below the information code 210, the right the information code 210 and the left of the information code 210. As illustrated in FIG. 3C, the visual information 220 may be arranged inside the visual code 210.

1-4. Functional Overview of System Control Unit

Figure 4:
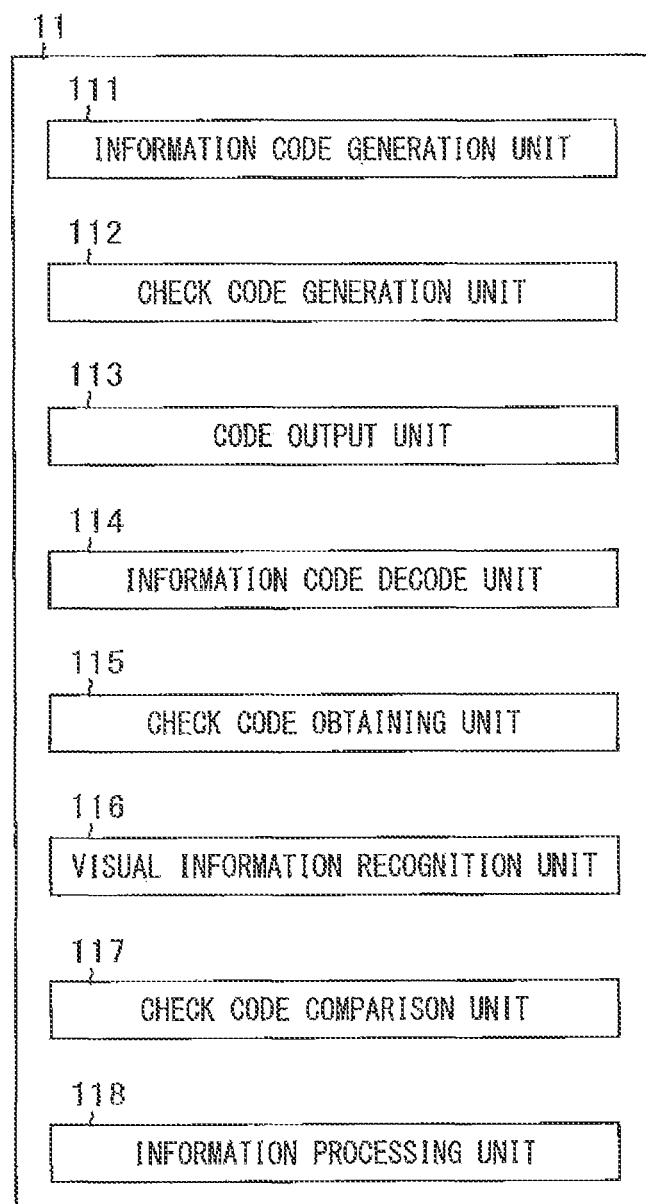
FIG. 4 is a view illustrating an example of a functional block in a system control unit 11 of the settlement management server 1 according to one embodiment.

Next, a functional overview of the system control unit 11 of the settlement management server 1 will be described with reference to FIGS. 4 to 7C. FIG. 4 is a view illustrating an example of a functional block in the system control unit 11 of the settlement management server 1 according to this embodiment. The system control unit 11 serves as an information code generation unit 111, a check code generation unit 112, a code output unit 113, an information code decode unit 114, a check code obtaining unit 115, a visual information recognition unit 116, a check code comparison unit 117, an information processing unit 118 and the like as illustrated in FIG. 4 when the CPU 11a reads to execute the various program codes included in the server program.

1-4-1. Issuance of Extended Information Code

Figure 5:
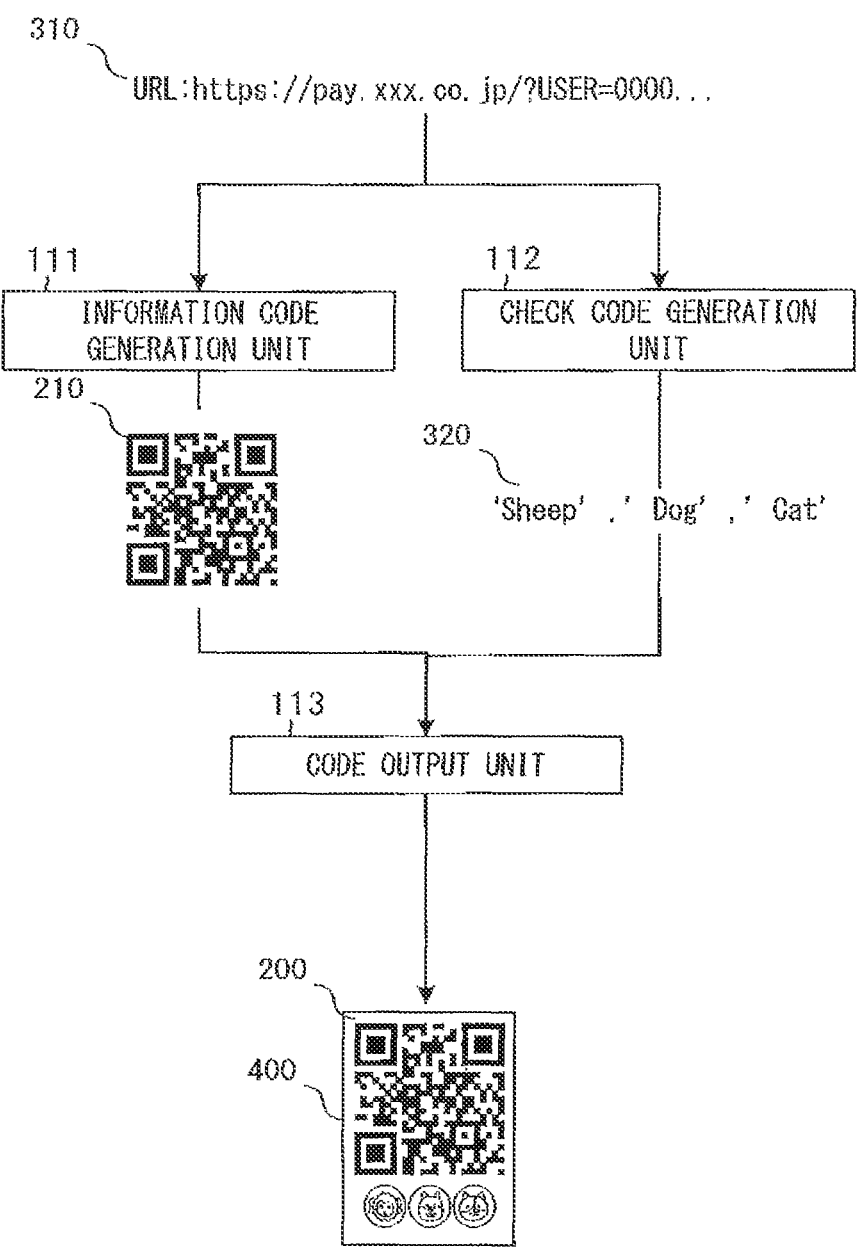
FIG. 5 is a view illustrating an example of a flow of data in a case where the extended information code 200 is issued.

FIG. 5 is a view illustrating an example of a flow of data in a case where the extended information code 200 is issued. The information code generation unit 111 obtains original information based on which the information code 210 is generated. In this embodiment, the original information is settlement information 310 illustrated in FIG. 5. The settlement information 310 includes, for example, information for identifying an item for which a purchase price is settled or a service for which a usage fee is settled. A format of the settlement information is not particularly limited; the settlement information may be represented by a URL, for example. The system control unit 11 may generate new settlement information 310 in response to an issuance request of the extended information code 200 transmitted from the store terminal 3 to the settlement management server, for example.

The information code generation unit 111 encodes the settlement information 310 which is the original information to generate the information code 210. The settlement information 310 is encoded by using an encoding method corresponding to the standards of the information code 210. The encoding method may be a known method.

The check code generation unit 112 generates, based on the settlement information 310 which is the original information, information indicating class(es) into which the object(s) which may be visually represented is classified. The generated information is a check code 320 illustrated in FIG. 5. The check code 320 indicates the class into which the object represented by the visual information 220 generated later is classified. The check code 320 includes one or a plurality of code elements. Each code element is a numerical value, a letter, a letter string or the like indicating the class into which the object which may be visually represented is classified. In the example illustrated in FIG. 5, the check code 320 indicates "sheep, dog, and cat". As described above, the visual information 220 which should be displayed together with the specific information code 210 so that a person may determine whether the information code 210 has been replaced is only the specific visual information 220. Therefore, it is necessary to generate the specific check code 320 from the specific settlement information 310 even if a situation, time and the like change. Note that, the same check code 320 may be generated for different information codes 210. However, the lower the probability of occurrence of such a situation, the better.

In order for a person to memorize the visual information 220, it is desirable that the number of elements forming the visual information 220 is smaller. On the other hand, the smaller the number of components, the higher the probability that the associated visual information 220 matches among a plurality of information codes 210. Even if the extended information code 200 has been replaced, if the visual information 220 has not been changed, a person cannot notice that the information code 210 has been replaced. Therefore, it is desirable that the visual information 220 be formed of a certain number of elements. For example, it is said that a person may memorize the number of up to about four digits in short-term memory. Therefore, in a case where a numeric string is used as the check code 320, the number of digits of the check code 320 may be four or smaller.

The check code generation unit 112 may convert the settlement information 310 into the check code 320 by a predetermined converting method (algorithm), for example. In this case, the check code generation unit 112 converts the settlement information 310 by using a method different from the encoding method for generating the information code 210 from the settlement information 310 to generate the check code 320. Therefore, the check code 320 is necessarily different from the information code 210. The converting method of the settlement information 310 is not particularly limited. The converting method to use may be reversible conversion or irreversible conversion. For example, the check code generation unit 112 may generate the check code 320 by hashing the settlement information 310.

The code output unit 113 associates the information code 210 generated by the information code generation unit 111 with the visual information 220 visually representing the object(s) classified into the class(es) indicated by the check code 320 generated by the check code generation unit 112 to output as the extended information code 200. For example, in a case where the visual information 220 includes picture(s), the storage unit 14 stores in advance, for each class, image data representing the object classified into the class. In a case where the visual information 220 includes number(s), letter(s), or symbol(s), the storage unit 14 stores in advance image data or font data of the number, the letter, or the symbol classified into the class for each class. The code output unit 113 generates the visual information 220 based on the image data (or font data). The code output unit 113 outputs an image including the information code 210 and the visual information 220, for example. The code output unit 113 may cause the printer 2 to print the information code 210 and the visual information 220 on a predetermined object 400. Outputting the information code 210 and the visual information 220 in association with each other means outputting the information code 210 and the visual information 220 in such a manner that a person may visually recognize that the information code 210 and the visual information 220 are associated with each other. For example, if the information code 210 and the visual information 220 are displayed on the same predetermined object 400, a person may recognize that the information code 210 and the visual information 220 are associated with each other.

1-4-2. Check of Extended Information Code

Figure 6:
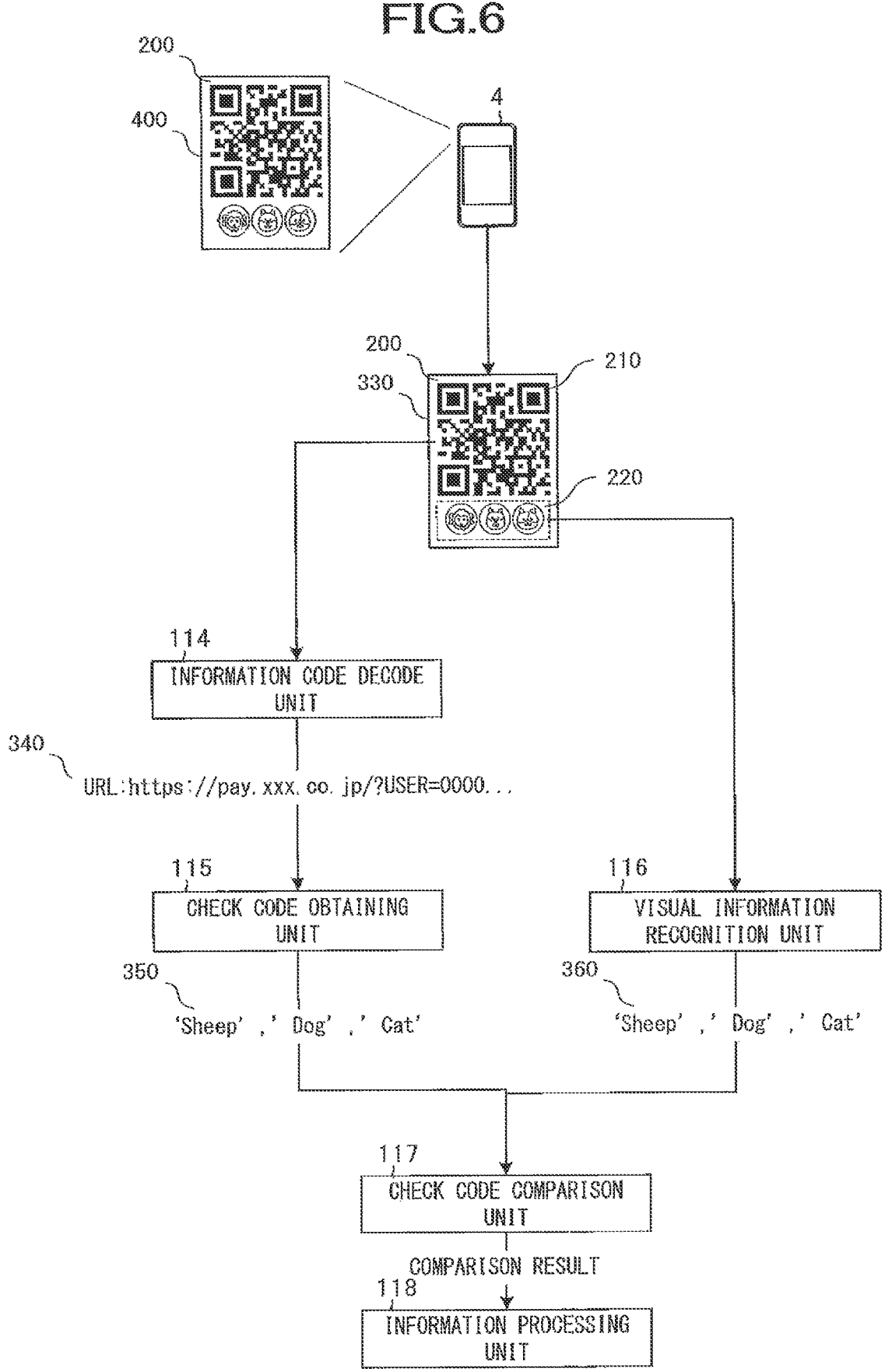
FIG. 6 is a view illustrating an example of a flow of data in a case where the extended information code 200 is checked.

FIG. 6 is a view illustrating an example of a flow of data in a case where the extended information code 200 is checked. As illustrated in FIG. 6, the extended information code 200 is displayed on a certain predetermined object 400. This extended information code 200 may be officially issued or not. Alternatively, there is a possibility that the predetermined object 400 on which the officially issued information code 200 had been printed has been replaced with another predetermined object 400 on which another officially issued information code 200 had been printed. Alternatively, there is a possibility that only the information code 210 in the extended information code 200 has been replaced.

In order to settle the purchase price of the item or the usage fee of the service, the user photographs the extended information code 200 with the digital camera provided on the user terminal 4. As a result, a photographic image 330 of the extended information code 200 is obtained. The user terminal 4 transmits the photographic image 330 to the settlement management server 1.

The information code decode unit 114 decodes the information code 210 included in the photographic image 330 based on the photographic image 330 received from the user terminal 4 to generate settlement information 340 which is the original information.

The check code obtaining unit 115 obtains, based on the settlement information 340 obtained by photographing the information code 210 and decoding by the information code decode unit 114, a check code 350 which is information indicating the class(es) into which the object(s) visually represented by the visual information which should be displayed together with the information code 210 is classified. The visual information which should be displayed together with the information code 210 is the visual information which is officially output in association with the information code 210 by the code output unit 113 (the visual information associated with the information code 210 in the officially issued extended information code). In this embodiment, the check code generation unit 112 generates the check code 320 by converting the settlement information 310 when the extended information code 200 is issued. Therefore, the check code obtaining unit 115 generates the check code 350 by converting the settlement information 340 by the same method. In this case, the check code generation unit 112 may also serve as the check code obtaining unit 115.

The visual information recognition unit 116 obtains a check code 360 indicating the class into which the object visually represented by the visual information 220 photographed together with the information code 210 because of display together with the information code 210 is classified. The visual information 220 photographed together with the information code 210 is the visual information 220 actually displayed together with the information code 210. The actually displayed visual information 220 may be the visual information officially output in association with the information code 210 or not. As described above in a case where only the information code 210 in the extended information code 200 has been replaced, the visual information 220 does not correspond to the information code 210 being displayed together. It is desirable that a classification result of the object(s) by the visual information recognition unit 116 is identical with a tendency of a classification result through human vision. The visual information recognition unit 116 may obtain the check code 360 by performing image classification on the photographic image 330, for example. For example, pattern matching may be used as a method of the image classification. For example, the visual information recognition unit 116 specifies the visual information 220 from the photographic image and divides the image of the visual information 220 into images of each component. The visual information recognition unit 116 calculates a degree of similarity between the image data stored for each class in the storage unit 14 and the image of each component. The visual information recognition unit 116 determines the class corresponding to the image data with the highest degree of similarity for each component and generates the check code 360. Alternatively, machine learning may be used as the method of the image classification. For example, a predetermined neural network model is trained in advance based on the image data stored in the storage unit 14. It is sufficient that one image data per class is used for training. The visual information recognition unit 116 inputs the image of each component into the trained model and causes the same to output information indicating the class of each component. The visual information recognition unit 116 combines the output information and generates the check code 360. Note that, it does not matter which of the check code 350 and the check code 360 is generated earlier.

The check code comparison unit 117 compares the check code 350 obtained by the check code obtaining unit 115 with the check code 360 obtained by the visual information recognition unit 116. In particular, the check code comparison unit 117 determines whether a result of comparison between the check code 350 and the check code 360 satisfies a predetermined condition. For example, the check code comparison unit 117 determines whether the check code 350 and the check code 360 match.

The information processing unit 118 controls execution of predetermined processing using the settlement information 340 obtained by the information code decode unit 114 based on the comparison result between the check code 350 and the check code 360 by the check code comparison unit 117. In this embodiment, the predetermined processing is the settlement processing. In a case where the comparison result satisfies the predetermined condition, the information processing unit 118 causes the settlement processing to be executed. On the other hand, in a case where the comparison result does not satisfy the predetermined condition, the information processing unit 118 does not cause the settlement processing to be executed (rejects execution of the settlement processing). Alternatively, in a case where the comparison result does not satisfy the predetermined condition, the information processing unit 118 may cause a notice based on the comparison result to be presented to the user. For example, the information processing unit 118 may cause the user terminal 4 to display the notice such as "This information code might be a fraudulent information code." After causing the notice to be presented, the information processing unit 118 may determine whether to execute the settlement processing according to selection by the user. For example, the information processing unit 118 further causes the user terminal 4 to display the message such as "Do you want to make settlement?". In a case where the user operates the user terminal 4 to select approval of the settlement, the information processing unit 118 causes the settlement processing to be executed. In a case where the user selects disapproval of the settlement, the information processing unit 118 does not cause the settlement processing to be executed.

Figure 7A:
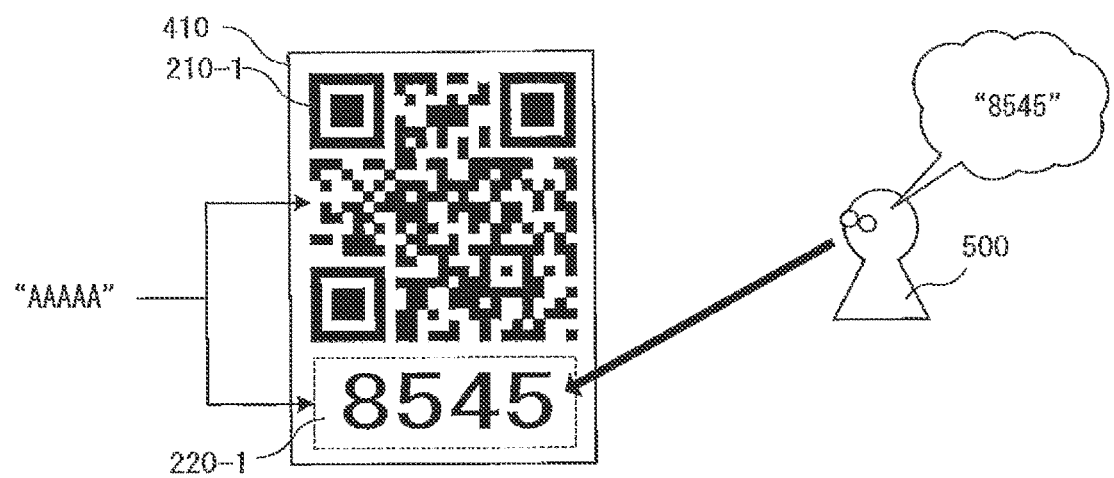
FIG. 7A is a view illustrating an example of determining a fraud regarding an information code.
Figure 7B:
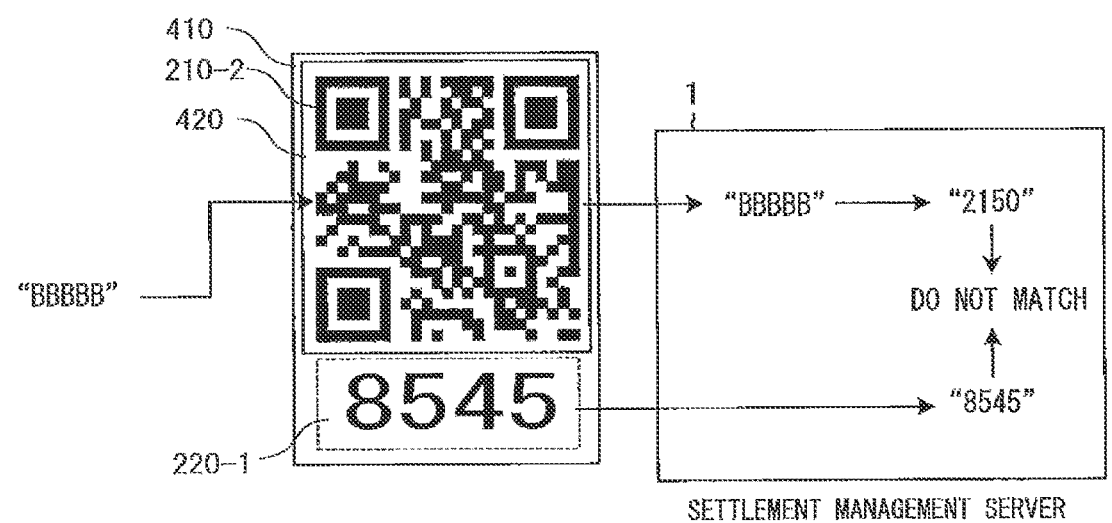
FIG. 7B is a view illustrating an example of determining a fraud regarding an information code.
Figure 7C:
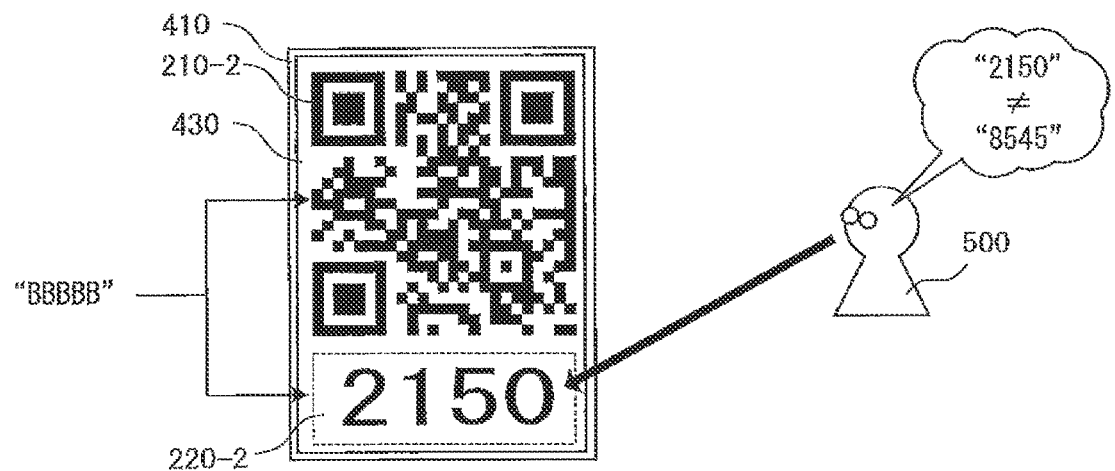
FIG. 7C is a view illustrating an example of determining a fraud regarding an information code.

FIG. 7A to FIG. 7C are views illustrating an example of determining a fraud regarding the information code. For example, the settlement management server 1 generated settlement information "AAAAA" for an item A sold by a store X. Then, as illustrated in FIG. 7A, the settlement management server 1 generated an information code 210-1 by encoding the settlement information "AAAAA". Also, the settlement management server 1 generated visual information 220-1 based on the settlement information "AAAAA". The visual information 220-1 is a numeral string "8545". The settlement management server 1 printed the information code 210-1 and the visual information 220-1 on a sticker 410. Thereafter, the sticker 410 was adhered in the store X. A person 500 who visits the store X may easily memorize the numeral string "8545" as the visual information 220-1 by looking at the sticker 410. The person 500 may be, for example, an employee of the store X or a customer of the store X.

Thereafter, for example, for an item B of a malicious person Y unrelated to the store X, settlement information "BBBBB" was generated. The item B might be a fictitious item. Then, as illustrated in FIG. 7B, an information code 210-2 was generated by encoding the settlement information "BBBBB". The information code 210-2 was printed on a sticker 420. The information code 210-2 might be issued by the person Y him/herself, or the settlement management server 1 might issue an extended information code including the information code 210-2 in response to a request from the person Y. The person Y visited the store X and secretly adhere the sticker 420 on the information code 210-1 printed on the sticker 410. That is, the information code 210-1 was replaced with the information code 210-2. Since the visual information 220-1 is not replaced, there is a possibility that the person 500 cannot notice the replacement of the information code 210-1. When a certain user wants to purchase the item A and photographs the information code 210-2 together with the visual information 220-1. A photographic image obtained by photographing is transmitted from the user terminal 4 to the settlement management server 1. The settlement management server 1 decodes the information code 210-2 included in the photographic image to generate the settlement information "BBBBB". Then, the settlement management server 1 obtains a check code based on the settlement information "BBBBB". Since the settlement information "BBBBB" is different from the settlement information "AAAAA", the check code generated from the settlement information "BBBBB" is very likely to be different from "8545". For example, a check code "2150" is generated. On the other hand, the settlement management server 1 image-recognizes the visual information 220-1 included in the photographic image to generate the check code "8545". Since the check code "2150" is different from the check code "8545", the settlement management server 1 rejects to execute the settlement processing for the item B. As a result, it is possible to avoid a situation in which the user who purchases the item A and the store X suffer damage.

Alternatively, as illustrated in FIG. 7C, the information code 210-2 is generated by encoding the settlement information "BBBBB", and visual information 220-2 is generated based on the settlement information "BBBBB". The visual information 220-2 is a numeral string "2150". The information code 210-2 and visual information 220-2 were printed on a sticker 430. The person Y secretly adhered the sticker 430 on the sticker 420. That is, the combination of the information code 210-1 and the visual information 220-1 was replaced with the combination of the information code 210-2 and the visual information 220-2. Thereafter, the person 500 who looks at the visual information 220-2 printed on the sticker 430 may easily recognize that the visual information 220-2 is the numeral string "2150". The numeral string "2150" is different from the numeral string "8545" memorized by the person 500. Therefore, the person 500 may notice that the information code 210-1 has been replaced. This allows the person 500 and the like to take measures such as peeling off the sticker 430 before someone photographs the information code 210-1 in order to purchase the item A. In this manner, it becomes easier for a person to determine whether the information code has been replaced. This enhances prevention of the fraud regarding the information code.

1-5. Operation of Electronic Settlement System

Next, an operation of the electronic settlement system S will be described with reference to FIGS. 8 and 9. FIG. 8 is a flowchart illustrating an example of information code issuance processing by the system control unit 11 of the settlement management server 1. When the settlement management server 1 receives the issuance request of the information code from the store terminal 3, the system control unit 11 executes the information code issuance processing according to the program code included in the server program.

As illustrated in FIG. 8, the system control unit 11 generates the new settlement information 310 in response to the issuance request (step S101). Next, the information code generation unit 111 encodes the generated settlement information 310 to generate a new information code 210 (step S102). Next, the check code generation unit 112 generates the check code 320 by converting the settlement information 310 such as by hashing using a predetermined hash function (step S103). Next, the code output unit 113 generates the visual information 220 corresponding to the generated check code 320 (step S104). For example, the code output unit 113 obtains the image data corresponding to each class indicated by the check code 320 from the storage unit 14. The code output unit 113 combines the obtained image data according to class order indicated by the check code 320 to generate image data of the visual information 220. The code output unit 113 outputs the generated information code 210 and the visual information 220 in association with each other (step S105). For example, the code output unit 113 combines the image data of the information code 210 and the image data of the visual information 220 to generate image data of the extended information code 200. The code output unit 113 transmits the generated image data to the printer 2 and causes the printer 2 to print the extended information code 200. When step S105 ends, the information code issuance processing ends.

FIG. 9 is a flowchart illustrating an example of information code use control processing by the system control unit 11 of the settlement management server 1. The user photographs the extended information code 200 displayed on the predetermined object with the user terminal 4. Then, the user terminal 4 transmits the photographic image 330 of the extended information code 200 to the settlement management server 1. When the settlement management server 1 receives the photographic image 330 from the user terminal 4, the system control unit 11 executes the information code use control processing according to the program code included in the server program.

As illustrated in FIG. 9, the system control unit 11 obtains the photographic image 330 transmitted from the user terminal 4 via the communication unit 15 (step S201). Next, the information code decode unit 114 decodes the information code included in the photographic image 330 to generate the settlement information 340 (step S202). Next, the check code obtaining unit 115 generates the check code 350 by converting the settlement information 340 by the same method as that at step S103 in the information code issuance processing illustrated in FIG. 8 (step S203). Next, the visual information recognition unit 116 obtains the check code 360 indicating the class (s) of the object (s) represented by the visual information 220 by performing the image classification on the photographic image 330 (step S204). For example, the visual information recognition unit 116 identifies the class into which the object represented by each component of the visual information 220 included in the photographic image 330 is classified. The visual information recognition unit 116 generates the check code 360 by combining the information indicating the specified classes according to an arrangement of the components.

Next, the check code comparison unit 117 determines whether the check code 350 and the check code 360 match (step S205). In a case where it is determined that the check code 350 and the check code 360 match (step S205: YES), the process proceeds to step S206. At step S206, the information processing unit 118 executes the settlement processing (step S206). For example, the information processing unit 118 obtains, from the database stored in the storage unit 14, information on a credit card of the user who uses the user terminal 4 which transmits the photographic image 330. The information processing unit 118 also identifies a paid amount and a paid store based on the settlement information 340. Based on the obtained information, the information processing unit 118 cooperates with a server device of a credit company not illustrated to execute processing for settling the amount from the user to the store. Next, the information processing unit 118 transmits a message indicating that the electronic settlement is completed to the user terminal 4 (step S207). On the other hand, in a case where it is determined that the check code 350 does not match the check code 360 (step S205: NO), the process proceeds to step S208. At step S208, the information processing unit 118 transmits an error message to the user terminal 4 (step S208). Accordingly, the user terminal 4 displays an error message such as "Settlement is rejected because the information code is wrong.", for example. When step S207 or S208 ends, the information code use control processing ends.

1-6. Variation

Each store terminal 3 may execute a part of or entire processing regarding the issuance of the extended information code 200. In this case, for example, each store terminal 3 may include the printer. The CPU provided on each store terminal 3 serves as at least one of the information code generation unit 111, the check code generation unit 112, and the code output unit 113. For example, when having generated the extended information code 200, the settlement management server 1 may transmit the extended information code 200 to the store terminal 3. Then, the store terminal 3 may print the extended information code 200. Alternatively, the store terminal 3 may generate the information code 210 and the settlement management server 1 may generate the visual information 220. Then, the store terminal 3 may combine the information code 210 and the visual information 220 to generate the extended information code 200. Alternatively, the store terminal 3 may generate both the information code 210 and the visual information 220. However, in a case where it is important to conceal a method of converting the settlement information 310 to generate the check code from the viewpoint of security, the settlement management server 1 desirably generate the visual information 220.

Each user terminal 4 may execute a part of or entire processing regarding the check of the extended information code 200. In this case, the CPU provided on each user terminal 4 serves as at least one of the information code decode unit 114, the check code obtaining unit 115, the visual information recognition unit 116, the check code comparison unit 117, and the information processing unit 118. For example, the user terminal 4 may decode the information code 210 to generate the settlement information 340. The user terminal 4 may transmit the settlement information 340 and the photographic image 330 to the settlement management server 1. In this case, the settlement management server 1 generates and compares the check codes 350 and 360. The user terminal 4 may further recognize the visual information 220 from the photographic image 330 and generate the check code 350. Then, the user terminal 4 may transmit the check code 350 and the settlement information 340 to the settlement management server 1. In this case, the settlement management server 1 generates the check code 360 and compares the check code 350 with the check code 360. The user terminal 4 may further convert the settlement information 340 to generate the check code 360. In this case, the user terminal 4 also compares the check code 350 with the check code 360. In a case where the check code 350 and the check code 360 match, the user terminal 4 transmits the settlement information 340 to the settlement management server 1. In a case where the check code 350 and the check code 360 are different from each other, the user terminal 4 rejects the transmission of the settlement information 340. As a result, the user terminal 4 controls the execution of the settlement processing by the settlement management server 1. The settlement management server 1 executes the settlement processing only in a case where the settlement information 340 is received from the user terminal 4. Note that, as described above, from the viewpoint of security, it is desirable that the settlement management server 1 generates the check code 360.

As described above, according to this embodiment, the information code generation unit 111 encodes the settlement information 340 to generate the optically readable information code 210. Also, the check code generation unit 112 obtains, based on the settlement information 340, the check code 320 indicating the class(es) into which the object(s) capable to be visually represented is classified. Also, the code output unit 113 outputs the generated information code 210 and the visual information 220 which visually represents the object classified into the class(es) indicated by the generated check code 320 in association with each other. Therefore, it becomes easy for a person to determine whether the information code 210 has been replaced. In a case where a person determines that the information code 210 has been replaced, the person may stop reading of the currently displayed information code 210. As a result, predetermined processing is not executed. In this manner, the fraud regarding the information code 210 is suppressed.

The check code generation unit 112 may convert the settlement information 340 by using a method different from the encoding method for generating the information code 210 from the settlement information 340 to generate the check code 320. According to this aspect, the check code 320 different from the information code 210 is generated by the conversion.

The visual information 220 may represent the object(s) such that the class(es) can be recognized through human vision. The visual information may include at least one of picture(s), number(s), letter(s), and symbol(s). The information code 210 may include a plurality of geometric figures.

The code output unit 113 may output an image in which the visual information 220 is arranged outside the information code 210. The code output unit 113 may output an image in which the visual information 220 is arranged inside the information code 210.

Also, the check code obtaining unit 115 obtains, based on the settlement information 340 obtained by photographing and decoding the optically readable information code 210, the check code 350 indicating the class(es) into which the object(s) visually represented by the visual information 220 which should be displayed together with the information code 210 is classified. Also, the visual information recognition unit 116 obtains the check code 360 indicating the class(es) into which the object(s) visually represented by the visual information 220 photographed together with the information code 210 because of display together with the information code 210 is classified. Also, the check code comparison unit 117 compares the obtained check code 350 with the obtained check code 360. Also, the information processing unit 118 controls execution of the predetermined processing using the obtained settlement information 340 based on the comparison result. Therefore, it becomes easy for a person to determine whether the information code 210 has been replaced. In a case where a person determines that the information code 210 has been replaced, the person may stop the reading of an information code 210 currently displayed. As a result, predetermined processing is not executed. In this manner, the fraud regarding the information code 210 is suppressed.

The check code obtaining unit 115 may generate the check code 350 by converting the obtained settlement information 340. The visual information recognition unit 116 may obtain the check code 360 by performing the image classification on the photographic image 330 obtained by photographing the information code 210 and the visual information 220. According to this aspect, the check code 350 may be obtained even when the settlement information 340 and the check code 350 are not stored in advance in association with each other. It is possible to obtain the check code 360 indicating the same class(es) as the class(es) which a person tends to recognize visually from the visual information 220.

The check code obtaining unit 115 may also generate the check code 350 from the settlement information 340 by using a method different from the encoding method for generating the information code 210 from the settlement information 340. According to this aspect, the check code 350 different from the information code 210 is generated by the conversion.

Tn a case where the comparison result between the check codes 350 and 360 satisfies a predetermined condition, the information processing unit 118 may cause the predetermined processing to be executed, and in a case where the comparison result does not satisfy the predetermined condition, this may not cause the predetermined processing to be executed. According to this aspect, in a case where the information code 210 has been replaced, the predetermined processing is prevented from being wrongly executed.

In a case where the comparison result satisfies the predetermined condition, the information processing unit 118 may cause the predetermined processing to be executed, and in a case where the comparison result does not satisfy the predetermined condition, this may cause the notice based on the comparison result to be presented to the user. According to this aspect, the user may recognize that the information code 210 might be replaced.

In a case where the comparison result does not satisfy the predetermined condition, the information processing unit 118 may determine whether to cause the predetermined processing to be executed according to the selection by the user. According to this aspect, it is possible for the user to execute the predetermined processing at user's own responsibility after recognizing that the information code 210 might be replaced.

2. Second Embodiment

Next, a second embodiment will be described with reference to FIGS. 10 to 12. This embodiment is the same as the first embodiment except for points described below. In this embodiment, a check code is obtained by a method other than converting settlement information or irrespective of the settlement information.

FIG. 10 is a view illustrating an example of information stored in a check code DB 14a. In this embodiment, the check code DB 14a is stored in a storage unit 14 of a settlement management server 1. "DB" is an abbreviation for the database. The check code DB 14a stores information regarding a check code 320 generated in an electronic settlement system S. For example, the check code DB 14a stores a store ID, settlement information 310, and the check code 320 in association with each other for each issued information code 210. The store ID is information for identifying a store. The store ID in the check code DB 14a indicates the store which requests issuance of the information code 210. The settlement information 310 is original information of the issued information code 210. The check code 320 corresponds to visual information 220 associated with the issued information code 210.

Figure 11:
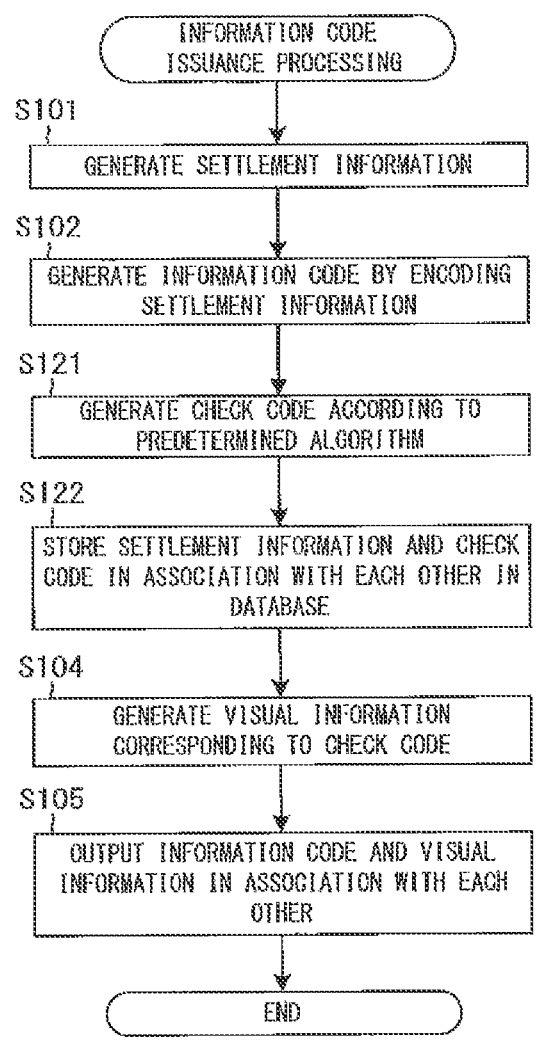
FIG. 11 is a flowchart illustrating an example of information code issuance processing by the system control unit 11 of the settlement management server 1.

FIG. 11 is a flowchart illustrating an example of information code issuance processing by a system control unit 11 of the settlement management server 1. In FIG. 11, the same steps as those in FIG. 8 are assigned with similar reference signs. As illustrated in FIG. 11, first, steps S101 and S102 are executed. Next, a check code generation unit 112 generates a new check code 320 according to a predetermined algorithm (step S121). For example, the check code generation unit 112 may randomly determine the check code 320. Alternatively, the check code generation unit 112 may determine the check code 320 in predetermined order. Next, the check code generation unit 112 stores the settlement information 310 and the check code 320 in association with each other in the check code DB 14a (step S122). Thereafter, steps S104 and S105 are executed, and the information code issuance processing ends.

Figure 12:
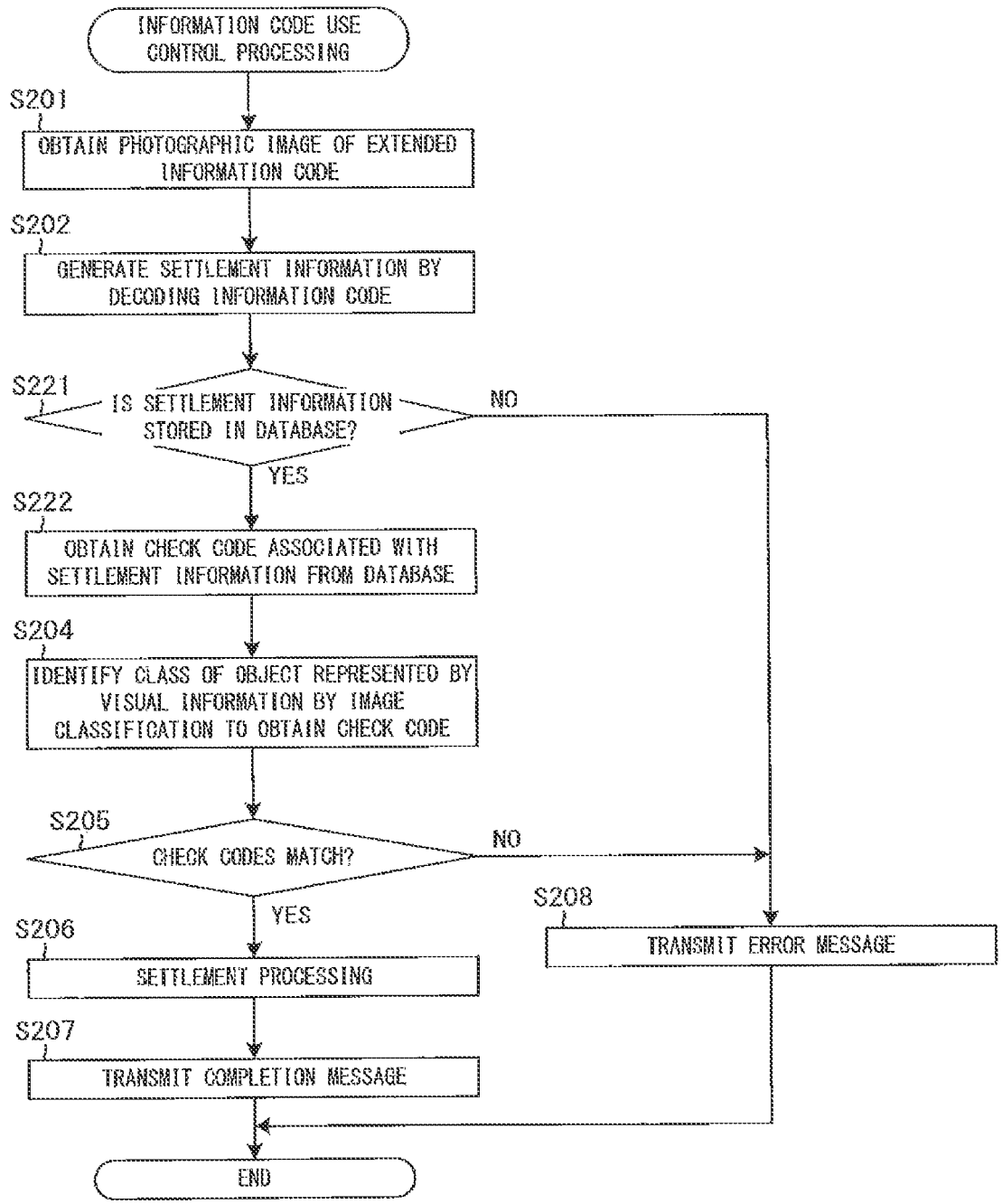
FIG. 12 is a flowchart illustrating an example of information code use control processing by the system control unit 11 of the settlement management server 1.

FIG. 12 is a flowchart illustrating an example of information code use control processing by the system control unit 11 of the settlement management server 1. In FIG. 12, the same steps as those in FIG. 9 are assigned with similar reference signs. As illustrated in FIG. 12, first, steps S201 and S202 are executed. Next, a check code obtaining unit 115 determines whether settlement information 340 which matches settlement information 340 generated at step S202 is stored in the check code DB 14a (step S221). In a case where it is determined that the settlement information 340 is not stored in the check code DB 14a (step S221: NO), the information processing unit 118 transmits an error message to a user terminal 4 (step S208). This determination result indicates that the information code 210 read by the user terminal 4 is not officially issued by the electronic settlement system S. On the other hand, in case where it is determined that the settlement information 340 is stored in the check code DB 14a (step S221: YES), the process proceeds to step S222. At step S222, the check code obtaining unit 115 obtains a check code 350 associated with the settlement information 340 from the check code DB 14a. Then, steps S204 and S205 are executed. At step S205, it is determined whether the check code 350 obtained from the check code DB 14a matches a check code 360. Depending on a result of this determination, steps S206 and S207 are executed, or step S208 is executed.

As described above, in this embodiment also, as in the first embodiment, each store terminal 3 may execute a part of or entire processing regarding the issuance of the extended information code 200. Also, each user terminal 4 may execute a part of or entire processing regarding the check of the extended information code 200. However, the check code DB 14a is required to be provided on the settlement management server 1.

As described above, this embodiment also makes it easier for a person to determine whether the information code 210 has been replaced.

3. Third Embodiment

Next, a third embodiment will be described with reference to FIGS. 13 to 17. This embodiment is the same as the second embodiment except for points described below. In this embodiment, position information is used for generating a check code when an information code is issued, and the position information is used for checking the information code.

Figure 13:
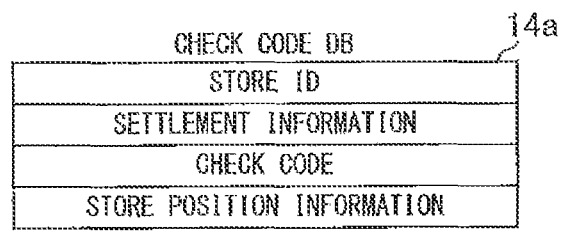

FIG. 13 is a view illustrating an example of information stored in a check code DB 14a. In this embodiment, the check code DB 14a stores a store ID, settlement information 310, a check code 320, and store position information 360 in association with each other for each issued information code 210. The store position information indicates a position of a place where the issued information code 210 should be displayed. That is, the store position information indicates the place where a predetermined object 400 on which an extended information code 200 is displayed should be placed. The place where the information code 210 should be displayed is usually a store which request issuance of the information code 210. However, when the issuance of the information code 210 is requested, an employee of the store may specify a place different from the store (a place where an item is sold or a service is provided) as the place where the information code 210 should be displayed. The position of the place where the information code 210 should be displayed may be indicated by latitude and longitude or may be indicated by an address, for example.

When issuing the information code 210 in this embodiment, a check code generation unit 112 obtains the position information indicating the position of the place where the information code should be displayed. This position information is, for example, store position information. Then, the check code generation unit 112 generates a check code 320 different from a check code already generated for another information code which should be displayed in a place within a predetermined distance from the place indicated by the obtained position information. This secures that visual information 220 is different between extended information codes 200, whose places where they should be displayed are relatively close to each other. Therefore, in a case where the extended information code 200 displayed in a certain place has been replaced with the extended information code 200 which should be displayed in a place nearby, an employee and the like of the store may notice the replacement.

Figure 14:
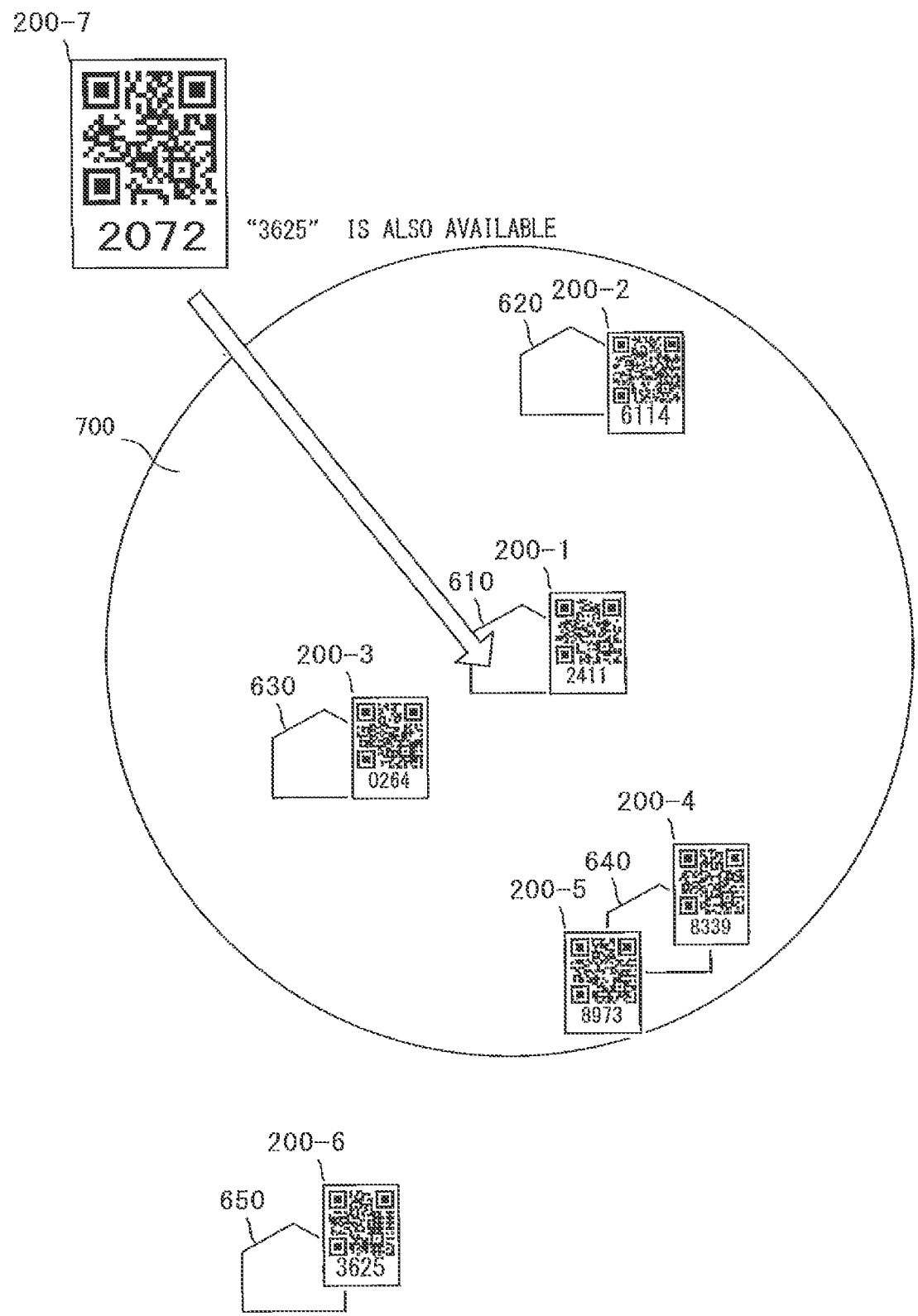
FIG. 14 is a view illustrating a generation example of the extended information code 200.

FIG. 14 is a view illustrating a generation example of the extended information code 200. As illustrated in FIG. 14, it is assumed that a new extended code 200-7 is issued for a store 610, for example. An area 700 is an area surrounded by a circle having a predetermined radius from the store 610. In the area 700, in addition to the store 610, there are stores 620 to 640. An extended information code 200-1 has been already issued for the store 610. An extended information code 200-2 has been issued for the store 620. An extended information code 200-3 has been issued for the store 630. Extended information codes 200-4 and 200-5 have been issued for the store 640. Pieces of visual information 220 included in the extended information codes 200-1 to 200-5 are "2411", "6114", "0264", "8339", and "8973", respectively. Therefore, the visual information 220 included in the newly issued extended information code 200-7 is, for example, "2072" which is different from any of them. Outside the area 700, there is a store 650. An extended information code 200-6 has been issued for the store 650. The visual information 220 included in the extended information code 200-6 is "3625". Here, even if the visual information 220 included in the newly issued extended information code 200-7 becomes "3625", there is no problem for the reason described below.

The check code generation unit 112 may generate a check code, among a plurality of check codes different from the already generated check code for another information code which should be displayed in a place within a predetermined distance, having a relatively small degree of overlap with the already generated check code. That is, the check code generation unit 112 generates the check code 320 having as small degree of overlap as possible with the already generated check code. The check code generation unit 112 may generate the check code 320 having the smallest degree of overlap among the check codes different from the already generated check code, for example. In this embodiment, the check code is formed of code elements each indicating a class into which an object which may be visually represented is classified. The degree of overlap may correspond to, for example, the number of code elements, among the code elements forming the check code 320, having the same value and position with the code elements forming the already generated check code. For example, a Hamming distance may be used as information indicating the degree of overlap. In this case, the longer the Hamming distance, the smaller the degree of overlap. For example, the Hamming distance between the numeral strings "1563" and "4581" is 3. The check code generation unit 112 may determine a larger degree of overlap in a case where there are components having different positions but the same value. For example, the Hamming distance between numeral strings "1623" and "1929" is 2, and the Hamming distance between numeral strings "1623" and "1329" is also 2. While "9" in the numeral string "1929" is not included in the numeral string "1623", "3" in the numeral string "1329" is included in the numeral string "1623". Therefore, the numeral string "1929" has a smaller degree of overlap than "1329".

The check code 320 having a relatively small degree of overlap is generated and the visual information 220 is generated, so that it becomes easy for a person to determine whether the visual information 220 changes. The smaller the degree of overlap between the generated visual information 220 and another visual information 220, the lower the similarity between the visual information 220 and another visual information 220, so that it is easier for a person to distinguish the visual information. In a case where memory of the visual information 220 seen in the past by the person is ambiguous, there is a case where it is not easy to determine whether the visual information 220 currently seen by the person and the visual information 220 seen in the past match. However, if the visual information 220 currently seen is easily distinguished from the visual information 220 seen in the past, the person may easily determine that they are different from each other even if the memory is ambiguous.

Figure 15:
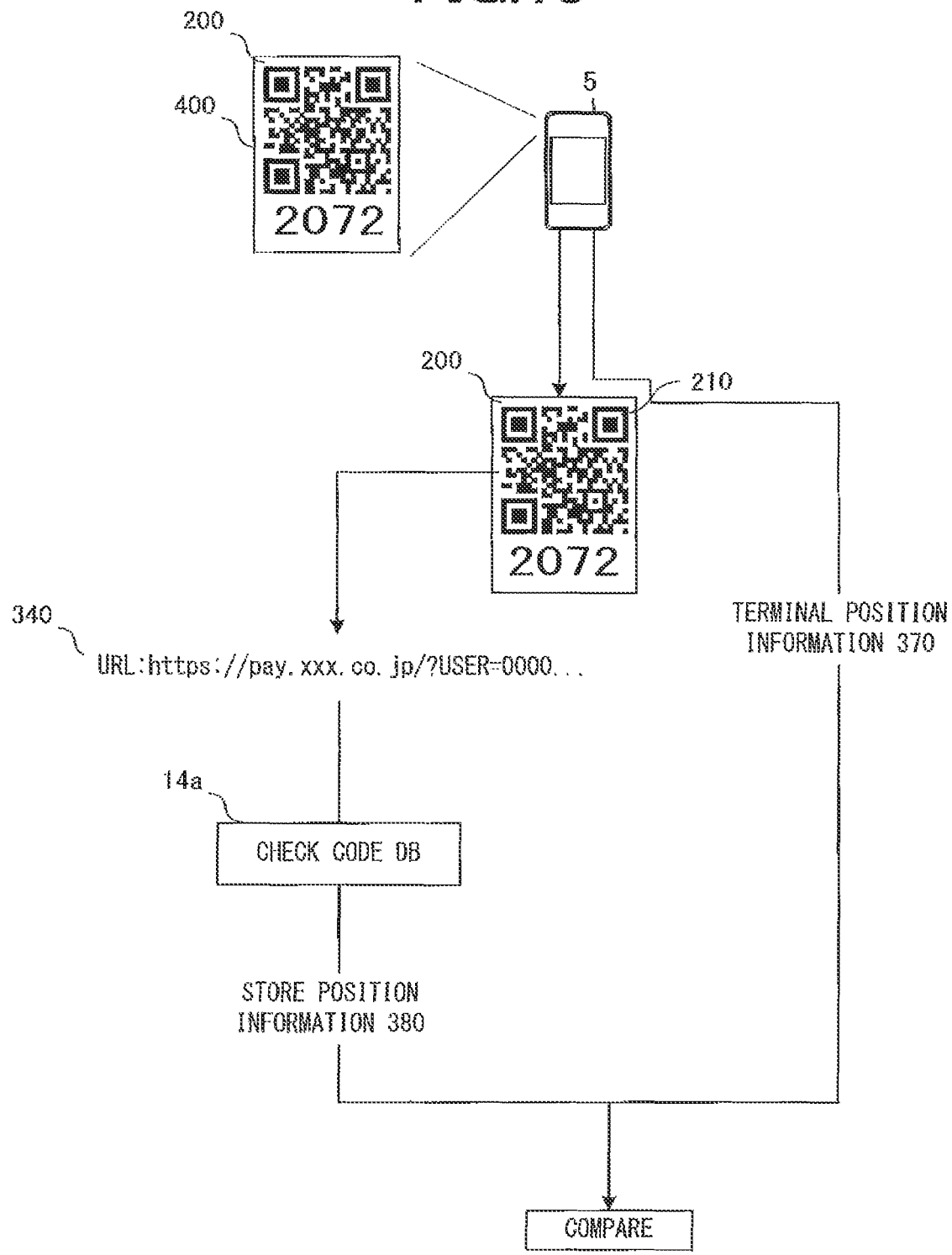
FIG. 15 is a view illustrating an example of a flow of data for comparing position information.

FIG. 15 is a view illustrating an example of a flow of data for comparing the position information when checking the extended code. In this embodiment, each user terminal 4 has a function of obtaining terminal position information indicating a position of the user terminal 4. For example, the latitude and longitude may be calculated as the terminal position information by using a global navigation satellite system such as a global positioning system (GPS). Also, for example, a mobile communication carrier may provide the position information using a base station to the user terminal 4. In this case, the user terminal 4 obtains the latitude and longitude or the address corresponding to a position of the base station near the user terminal 4 as the terminal position information. When having photographed the extended code 200, the user terminal 4 may transmit terminal position information 370 at that time to a settlement management server 1 together with a photographic image 330 of the extended code 200, as illustrated in FIG. 15.

When checking the extended information code 200, the check code comparison unit 117 obtains the position information indicating the position of the place where the extended information code 200 is photographed. This position information is, for example, the terminal position information 370 transmitted from the user terminal 4. Also, the check code comparison unit 117 obtains, based on the settlement information 340 generated by the information code decode unit 114, the position information indicating the position of the place where the information code 210 should be displayed. This position information is, for example, store position information 380. For example, the check code comparison unit 117 obtains the store position information 380 associated with the settlement information 340 from the check code DB 14a. The check code comparison unit 117 further compares the obtained store position information 380 with the obtained terminal position information 370.

The information processing unit 118 controls execution of predetermined processing using the settlement information 340 based on a comparison result between the check code 350 and the check code 360 and a comparison result between the store position information 380 and the terminal position information 370. Specifically, the information processing unit 118 executes settlement processing in a case where the check code 350 and the check code 360 match and a distance between the position indicated by the store position information 380 and the position indicated by the terminal position information 370 is shorter than a predetermined threshold. On the other hand, even if the check code 350 and the check code 360 match, the information processing unit 118 rejects to execute the settlement processing in a case where the distance between the position indicated by the store position information 380 and the position indicated by the terminal position information 370 is longer than the threshold. Therefore, in a case where the extended information code 200 displayed in a certain place has been replaced with the extended information code 200 which should be displayed in a place relatively far from the place, the settlement management server 1 may reject the settlement processing. Note that the threshold of the distance may be the same as the above-described predetermined distance or may be different from the predetermined distance.

In the example illustrated in FIG. 14, it is assumed that the extended information code 200-7 displayed in the store 610 has been replaced with any one of the extended information codes 200-2 to 200-5. However, any visual information 220 included in the extended information codes 200-2 to 200-5 is different from the visual information 220 included in the extended information code 200-7. Therefore, an employee and the like of the store 610 is likely to notice that the extended information code 200-7 has been replaced. It is assumed that the extended information code 200-7 in which the visual information 220 is "3625" is issued. In a case where the extended information code 200-7 has been replaced with the extended information code 200-6, the visual information 220 does not change, so that it is possible that the employee and the like does not notice the replacement. However, a distance between the store 610 where the extended information code 200-7 should be displayed and the store 650 where the extended information code 200-6 should be displayed is longer than the threshold. Therefore, even if the user terminal 4 reads the extended information code 200-6 at the store 610, the settlement processing is rejected by the comparison between the store position information 380 and the terminal position information 370 in the settlement management server 1.

Considering ease of memorizing the visual information 220 by a person, the number of patterns of the visual information 220 is preferably small. For example, in a case where the visual information 220 is formed of a 4-digit numeral string, the number of patterns of the visual information 220 is 10,000. On the other hand, the smaller the number of patterns of the visual information 220, the higher the probability that the visual information 220 match among the extended information codes 200 as a large number of extended information codes 200 are issued. However, in this embodiment, it is secured that the visual information 220 is different within a range of the predetermined distance. Therefore, it is possible to decrease the number of patterns of the visual information 220 while maintaining a situation in which a person may easily determine whether the information code 210 has been replaced.

Note that, it is possible that both generation of the check code using the position information when issuing the extended information code 200 and comparison of the position information when checking the extended information code 200 are performed, or only one of them is performed.

Figure 16:
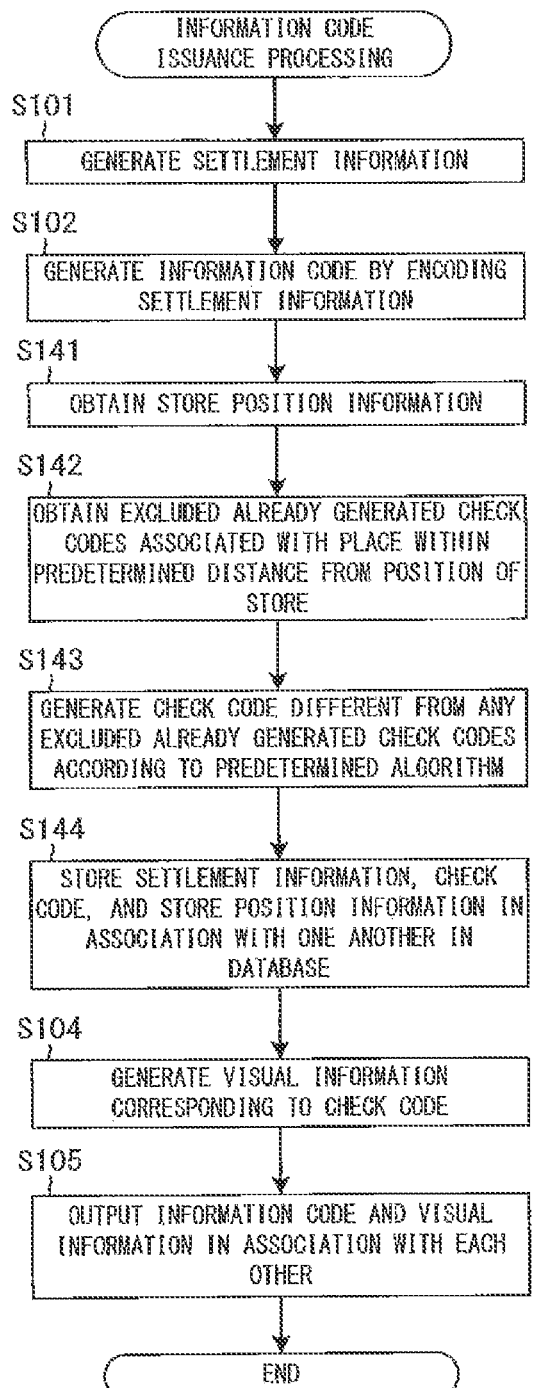
FIG. 16 is a flowchart illustrating an example of information code issuance processing by the system control unit 11 of the settlement management server 1.

FIG. 16 is a flowchart illustrating an example of information code issuance processing by a system control unit 11 of the settlement management server 1. In FIG. 16, the same steps as those in FIG. 11 are assigned with similar reference signs. As illustrated in FIG. 16, first, steps S101 and S102 are executed. Next, the check code generation unit 112 obtains, as the position of the place where the information code should be displayed, the store position information indicating the position of the store in which the store terminal 3 which transmits the issuance request of the information code 210 is installed (step S141). For example, the check code generation unit 112 may obtain the address of the store which has transmitted the issuance request as the store position information from a store address database stored in the storage unit 14.

Next, the check code generation unit 112 calculates the distance between the position indicated by the store position information of the store which issues the issuance request and the position indicated by each store position information already stored in the check code DB 14a. The check code generation unit 112 identify, from the store position information stored in the check code DB 14a, the store position information the calculated distance of which is equal to or shorter than a predetermined distance. The check code generation unit 112 obtains the check code stored in the check code DB 14a in association with each identified store position information, as an excluded already generated check code (step S142).

Next, the check code generation unit 112 generates the check code 320 which is different from any of the obtained excluded already generated check codes according to a predetermined algorithm. For example, the check code generation unit 112 may randomly determine the check code 320 or may determine the check code 320 in predetermined order. In any case, it is sufficient that the check code 320 is finally different from the excluded already generated check codes. After that, the visual information 220 is generated based on the generated check code 320, and the extended information code 200 is output (steps S104 and S105).

Figure 17:
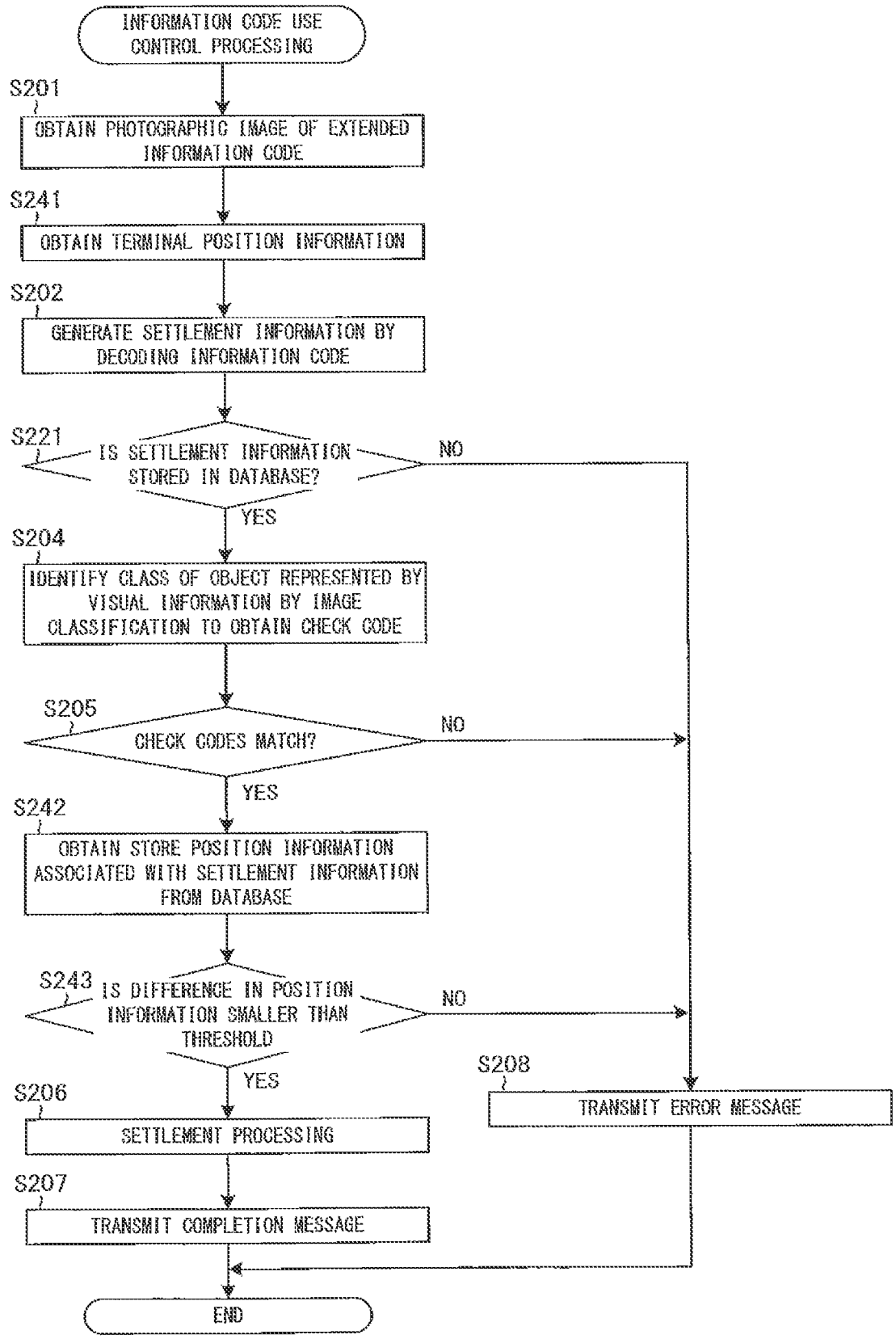
FIG. 17 is a flowchart illustrating an example of information code use control processing by the system control unit 11 of the settlement management server 1.

FIG. 17 is a flowchart illustrating an example of information code use control processing by the system control unit 11 of the settlement management server 1. In FIG. 17, the same steps as those in FIG. 12 are assigned with similar reference signs. As illustrated in FIG. 17, first, step S201 is executed. Next, the check code comparison unit 117 obtains the terminal position information 370 from the user terminal 4 together with the photographic image 330 via a communication unit 15 (step S241). Then, steps S202, S221, S204 and S205 are executed. In a case where it is determined that the check code 350 does not match the check code 360 at S205 (step S205: NO), step S208 is executed. On the other hand, in a case where it is determined that the check code 350 and the check code 360 match (step S205: YES), the process proceeds to step S242.

At step S242, the check code comparison unit 117 obtains the store position information 380 associated with the settlement information 340 generated at step S202 from the check code DB 14a. Next, the check code comparison unit 117 determines whether the difference between the store position information 380 and the terminal position information 370 is smaller than the threshold (step S243). In a case where it is determined that the difference between the store position information 380 and the terminal position information 370 is smaller than the threshold (step S243: YES), steps S206 and S207 are executed. On the other hand, in a case where it is determined that the difference between the store position information 380 and the terminal position information 370 is not smaller than the threshold (step S243: NO), step S208 is executed.

As described above, according to this embodiment, the check code generation unit 112 obtains the store position information indicating the position of the place where the information code 210 should be displayed. Also, the check code generation unit 112 generates the check code 320 different from the already generated check code generated for another information code 210 which should be displayed in a place within a predetermined distance from the place indicated by the obtained store position information. Therefore, in a case where the combination of the information code 210 and the visual information has been replaced with the combination of another information code 210 which should be displayed in a relatively close place and the visual information, a person may look at the visual information to determine whether the information code 210 has been replaced.

Also, the check code generation unit 112 may generate the check code 320 having a relatively small degree of overlap with the already generated check code among the check codes 320 different from the already generated check code. According to this aspect, it is possible for a person to easily determine whether the information code 210 has been replaced even if the memory of the visual information seen in the past is ambiguous.

Also, the check code comparison unit 117 obtains the store position information indicating the position of the place where the information code 210 should be displayed based on the obtained settlement information 340. Also, the check code comparison unit 117 obtains the terminal position information indicating the position of the place where the information code 210 and the visual information 220 are photographed. Also, the check code comparison unit 117 further compares the obtained store position information with the obtained terminal position information. Also, the information processing unit 118 controls the execution of the predetermined processing based on the comparison result between the check code 350 and the check code 360 and the comparison result between the store position information and the terminal position information. Therefore, even if the check code 350 and the check code 360 match, it is possible to suppress the predetermined processing from being wrongly executed based on the comparison result of the store position information and the terminal position information.

4. Fourth Embodiment

Next, a fourth embodiment will be described with reference to FIGS. 18 to 21. This embodiment is the same as the first embodiment except for points described below. In this embodiment, a conversion specification of settlement information 220 is determined from a plurality of different conversion specifications. The plurality of conversion specifications are determined in advance. Each conversion specification indicates, for example, at least one of a converting method and a fixed parameter used for the conversion. At least any one of the converting methods and the fixed parameter may be different between the plurality of conversion specifications. For example, a plurality of hash functions corresponding to the respective plurality of conversion specifications may be stored in a storage unit 14 in advance.

Figure 18:
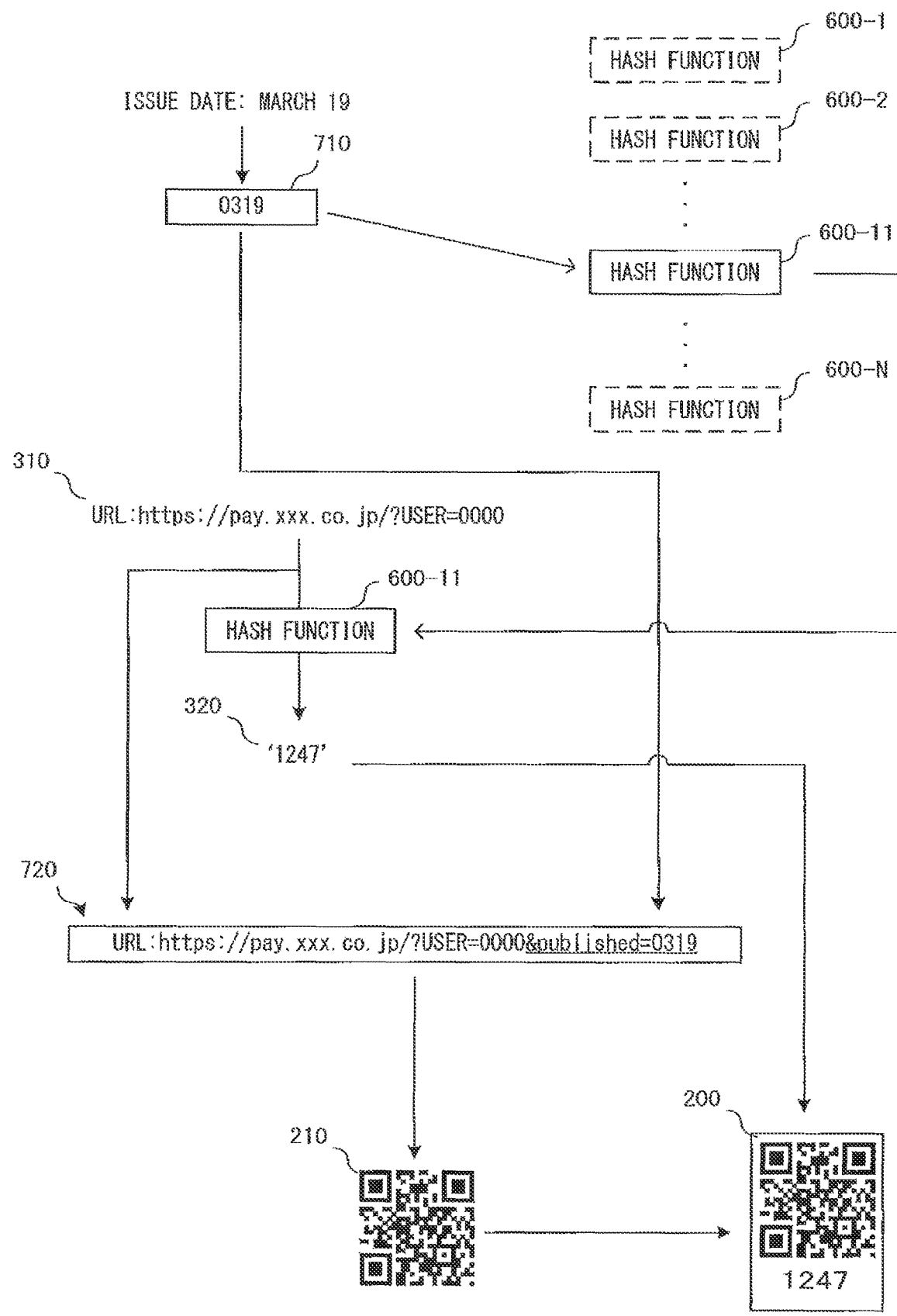
FIG. 18 is a view illustrating an example of a flow of data when the extended code 200 is generated.

FIG. 18 is a view illustrating an example of a flow of data when an extended code 200 is generated. When the extended information code 200 is issued, a check code generation unit 112 determines conversion specification to use among the plurality of different conversion specifications which may be used to convert settlement information 310 to generate the check code 320 for each information code 210 to be generated. The check code generation unit 112 generates the check code 320 according to the determined conversion specification. Here, it is desirable that the conversion specification is determined by an algorithm with which selection probabilities of the plurality of conversion specifications are uniform. For example, the check code generation unit 112 may randomly determine the conversion specification used for the conversion, or determine in predetermined order. Alternatively, the check code generation unit 112 may determine the conversion specification by using some other information. For example, the check code generation unit 112 may determine the conversion specification used for the conversion based on an issue date of the extended information code 200. The issue date is the date at which the extended information code 200 is output. As long as one conversion specification is determined according to the issue date, any method of determining the conversion specification may be used. The information used for determining the conversion specification may be information other than the issue date of the extended information code 200. However, it is desirable that information with which it is difficult for a third party to identify the information used to determine the conversion specification be used.

For example, as illustrated in FIG. 18, hash functions 600-1 to 600-N are stored in the storage unit 14 (N is a natural number which satisfies N>1). Today's date being the issue date is Mar. 19, 2019. Here, for example, issue date information 710 is generated. The issue date information 710 is "0319". For example, the hash function 600-11 is determined from the hash functions 600-1 to 600-N in response to "0319". The settlement information 310 is converted using the hash function 600-11, and the check code 320 is generated.

The information code generation unit 111 generates the information code 200 by encoding the settlement information 310 and specification information indicating the conversion specification used to generate the check code 320 among the plurality of conversion specifications. The specification information may be, for example, identification information of the conversion specification. In a case where the conversion specification is selected based on the issue date of the extended information code 200, the specification information may be the issue date information 710. For example, as illustrated in FIG. 18, the settlement information 310 and the issue date information 710 are combined to generate extended settlement information 720. The extended settlement information 720 is encoded to generate the information code 210. Then, the extended information code 200 including the information code 210 and visual information 220 is generated.

Figure 19:
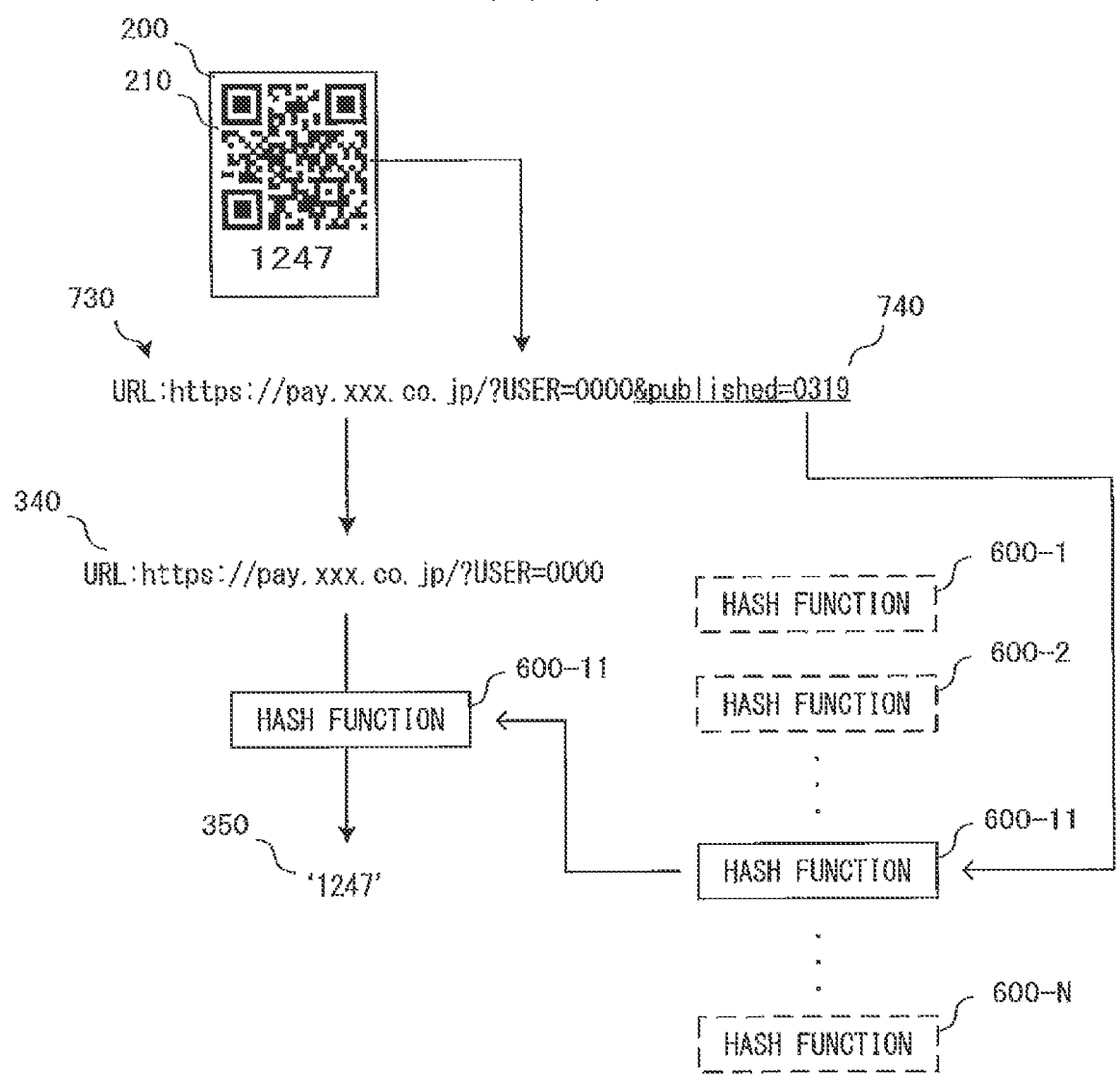
FIG. 19 is a view illustrating an example of a flow of data when the extended information code is checked.

FIG. 19 is a view illustrating an example of a flow of data when the extended information code is checked. An information code decode unit 114 decodes the information code 210 to generate settlement information 340 and specification information. This specification information indicates the conversion specification used to generate the check code 320 when the extended information code 200 is issued. In a case where the settlement information 340 and the specification information are generated by decoding the information code 210, the check code obtaining unit 115 generates a check code 350 according to the conversion specification indicated by the specification information among the plurality of conversion specifications. For example, as illustrated in FIG. 19, the information code 210 is decoded and extended settlement information 730 is generated. The extended settlement information 730 includes the settlement information 340 and issue date information 740. Since the issue date information 740 is "0319", the hash function 600-11 is selected from the hash functions 600-1 to 600-N. The settlement information 310 is converted using the hash function 600-11, and the check code 350 is generated. Then, the check code 350 is compared with a check code 360.

It becomes difficult to identify which conversion specification was used for which extended information code 200 only by looking at the visual information 220. Therefore, it becomes difficult for a malicious person to generate the visual information 220 which passes through the check of the extended code 200.

Figure 20:
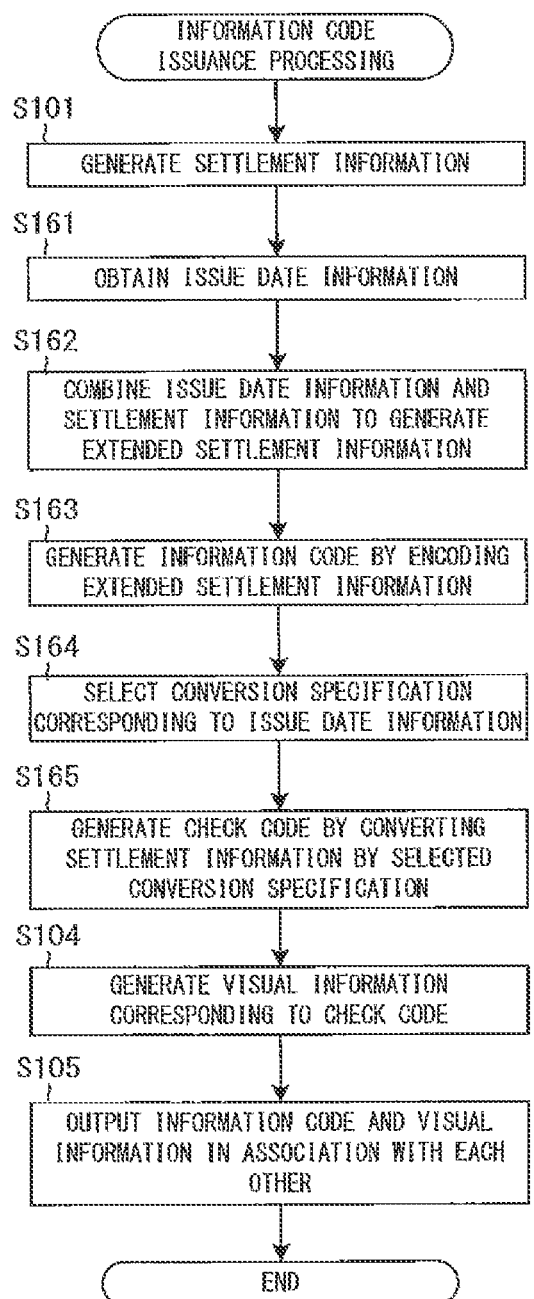
FIG. 20 is a flowchart illustrating an example of information code issuance processing by the system control unit 11 of the settlement management server 1.

FIG. 20 is a flowchart illustrating an example of information code issuance processing by the system control unit 11 of the settlement management server 1. In FIG. 20, the same steps as those in FIG. 8 are assigned with similar reference signs. As illustrated in FIG. 20, first, step S101 is executed. Next, the check code generation unit 112 obtains the issue date information 710 (step S161). For example, the check code generation unit 112 may obtain today's date as the issue date information 710. Next, the information code generation unit 111 combines the settlement information 310 and the issue date information 710 to generate the extended settlement information 720 (step S162). Next, the information code generation unit 111 encodes the generated extended settlement information 720 to generate a new information code 210 (step S163). Next, the check code generation unit 112 selects the conversion specification corresponding to the issue date information 710 from the plurality of conversion specifications (step S164). For example, the check code generation unit 112 may generate the identification information of the selected conversion specification by calculating a hash value of the issue date information 710. Then, the check code generation unit 112 converts the settlement information 310 according to the selected conversion specification to generate the check code 320 (step S165). Thereafter, steps S104 and S105 are executed.

Figure 21:
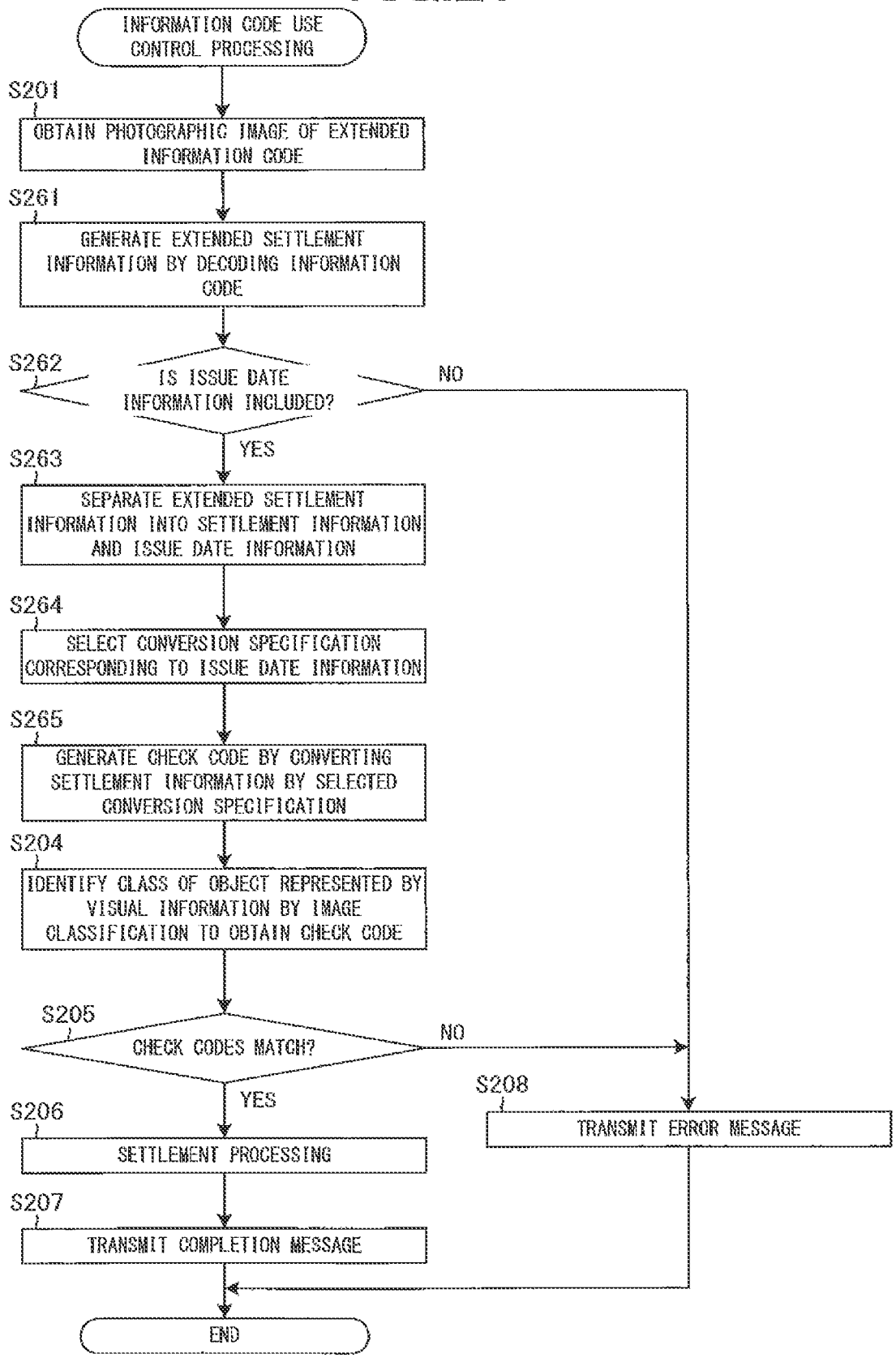
FIG. 21 is a flowchart illustrating an example of information code use control processing by the system control unit 11 of the settlement management server 1.

FIG. 21 is a flowchart illustrating an example of information code use control processing by the system control unit 11 of the settlement management server 1. In FIG. 21, the same steps as those in FIG. 9 are assigned with similar reference signs. As illustrated in FIG. 21, first, step S201 is executed. Next, the information code decode unit 114 decodes the information code 210 to generate the extended settlement information 730 (step S261). Next, the check code obtaining unit 115 determines whether the generated extended settlement information 730 includes the issue date information (step S262). In a case where it is determined that the extended settlement information 730 does not include the issue date information (step S262: NO), step S208 is executed. On the other hand, in case where it is determined that the extended settlement information 730 includes the issue date information (step S262: YES), the process proceeds to step S263.

At step S263, the check code obtaining unit 115 separates the extended settlement information 730 into the settlement information 340 and the issue date information 740. Next, the check code obtaining unit 115 selects the conversion specification corresponding to the issue date information 740 from the plurality of conversion specifications (step S264). Next, the check code obtaining unit 115 converts the settlement information 340 according to the selected conversion specification to generate the check code 350 (step S265). Then, steps S204 and S205 are executed. At step S205, it is determined whether the check code 350 generated at step S265 and the check code 360 match. Depending on a result of this determination, steps S206 and S207 are executed, or step S208 is executed.

As described above, according to this embodiment, the check code generation unit 112 determines the conversion specification to be used among the plurality of different conversion specifications capable of being used to convert the settlement information 340 to generate the check code 320 for each generated information. Also, the check code generation unit 112 generates the check code 320 according to the determined conversion specification. Also, the information code generation unit 111 generates the information code 210 by encoding the settlement information 340 and the specification information indicating the determined conversion specification among the plurality of conversion specifications. Therefore, it becomes difficult to identify the conversion specification used to generate the visual information. Therefore, it is possible to suppress a malicious third party from generating correct visual information which should be displayed together with a fraudulent information code 210.

Also, the check code generation unit 112 may generate the check code 320 according to the conversion specification corresponding to the issue date when the extended code 200 is output among the plurality of conversion specifications. Also, the information code generation unit 111 may generate the information code 210 by encoding the settlement information 340 and the issue date information 710.

5. Other Embodiments

A system to which the present invention is applicable is not limited to an electronic settlement system. The present invention is applicable to any system in which some processing is executed by using original information obtained by decoding an information code. For example, the present invention may be applied to a system for automatically accessing a website. In this case, for example, a URL is the original information. A user terminal 4 accesses the website according to the URL obtained by decoding the information code. The user terminal 4 may display, for example, a page of the accessed website, or may automatically execute some processing with the accessed web server. Also, for example, the present invention may be applied to a system for automatically making a call. In this case, a telephone number is the original information. The user terminal 4 makes a call using the telephone number obtained by decoding the information code.

Depending on systems, there is a case where a server device for executing predetermined processing using the information code, like a settlement management server 1, is not necessary. For example, in a case where each terminal device such as a store terminal 3 generates both the information code and visual information by converting the original information and prints an extended information code, and each user terminal 4 executes predetermined processing, the server device is not necessary.

REFERENCE SIGNS LIST

1 Settlement management server
2 Printer
3 Store terminal
4 User terminal
11 System control unit
12 System bus
13 Input/output interface
14 Storage unit
14a Check code DB
111 Information code generation unit
112 Check code generation unit
113 Code output unit
114 Information code decode unit
115 Check code obtaining unit
116 Visual information recognition unit
117 Check code comparison section
118 Information processing unit
NW Network
S Electronic settlement system

The invention claimed is:

1. An information code generating method performed by a computer, the method comprising:
   encoding original information to generate an optically readable information code;
   generating, based on the original information, class information indicating one or more classes into which one or more objects capable of being visually represented are classified; and
   outputting the generated information code and visual information visually representing the one or more objects classified into the one or more classes indicated by the generated class information in association with each other,
   wherein the class information generating includes converting the original information into the class information by using a method different from an encoding method for generating the information code from the original information.

2. The information code generating method according to claim 1, further comprising:
   determining, for each information code to be generated, a conversion specification to be used among a plurality of different conversion specifications capable of being used for converting the original information to generate the class information,
   wherein the class information generating includes generating the class information according to the determined conversion specification, and
   the information code generating includes encoding the original information and specification information indicating the determined conversion specification among the plurality of conversion specifications to generate the information code.

3. The information code generating method according to claim 2, wherein the specification information indicates a date at which the information code and the visual information are output, and
the class information generating includes generating the class information according to the conversion specification corresponding to the date among the plurality of conversion specifications.

4. The information code generating method according to claim 1, further comprising:
obtaining position information indicating a position of a place where the information code should be displayed,
wherein the class information generating includes generating the class information different from already generated class information generated for another information code which should be displayed in a place within a predetermined distance from the place indicated by the obtained position information.

5. The information code generating method according to claim 4,
wherein the class information generating includes generating the class information, among a plurality of pieces of class information different from the already generated class information, having a relatively small degree of overlap with the already generated class information.

6. The information code generating method according to claim 1,
wherein the visual information represents the one or more objects such that the one or more classes may be recognized through human vision.

7. The information code generating method according to claim 1,
wherein the visual information includes at least one of a picture, a number, a character, and a symbol.

8. The information code generating method according to claim 1,
wherein the information code includes a plurality of geometric figures.

9. The information code generating method according to claim 1,
wherein the outputting comprises outputting an image in which the visual information is arranged outside the information code.

10. The information code generating method according to claim 1,
wherein the outputting includes outputting an image in which the visual information is arranged inside the information code.

11. An information code generating system comprising:
at least one memory configured to store computer program instructions;
at least one processor configured to access the computer program instructions and operate as instructed by the computer program instructions, the computer program instructions including:
encoding instructions configured to cause at least one of the at least one processor to encode original information to generate an optically readable information code;
generation instructions configured to cause at least one of the at least one processor to generate, based on the original information, class information indicating one or more classes into which a one or more objects capable of being visually represented are classified; and
output instructions configured to cause at least one of the at least one processor to output the generated information code and visual information visually representing the one or more objects classified into the one or more classes indicated by the generated class information in association with each other,
wherein generation instructions are further configured to cause at least one of the at least one processor to convert the original information into the class information by using a method different from an encoding method for generating the information code from the original information.

12. A non-transitory computer readable medium storing thereon an information code generating program causing a computer to:
encode original information to generate an optically readable information code;
generate, based on the original information, class information indicating one or more classes into which a one or more objects capable of being visually represented are classified; and
output the generated information code and visual information visually representing the one or more objects classified into the one or more classes indicated by the generated class information in association with each other,
wherein the information code generating program is configured to cause the computer to generate the class information by converting the original information into the class information by using a method different from an encoding method for generating the information code from the original information.

13. The information code generating method according to claim 1,
wherein the visual information includes a picture.

14. The information code generating method according to claim 1,
wherein the visual information includes a number.

15. The information code generating method according to claim 1,
wherein the visual information includes a character.

16. The information code generating method according to claim 1,
wherein the visual information includes a symbol.

17. The information code generating method according to claim 1,
wherein the outputting includes outputting data of an digital image including both of the information code and the visual information.

18. The information code generating method according to claim 1,
wherein the outputting includes outputting the information code and the visual information such that the output information code and the visual information will be printed together on a predetermined object.

* * * * *